US007728812B2

(12) United States Patent
Sato et al.

(10) Patent No.: US 7,728,812 B2
(45) Date of Patent: Jun. 1, 2010

(54) PORTABLE ELECTRONIC DEVICE, DISPLAY METHOD, PROGRAM, AND GRAPHICAL USER INTERFACE THEREOF

(75) Inventors: Makoto Sato, Tokyo (JP); Hirotomo Fukuda, Kanagawa (JP); Kenji Fujita, Chiba (JP); Tomoyuki Oguchi, Tokyo (JP); Yoshihiro Chosokabe, Nagano (JP); Daisuke Mochizuki, Chiba (JP)

(73) Assignee: Sony Corporation, Tokyo (JP)

( * ) Notice: Subject to any disclaimer, the term of this patent is extended or adjusted under 35 U.S.C. 154(b) by 982 days.

(21) Appl. No.: 11/117,526

(22) Filed: Apr. 29, 2005

(65) Prior Publication Data
US 2005/0251760 A1    Nov. 10, 2005

(30) Foreign Application Priority Data

| May 7, 2004 | (JP) | 2004-139101 |
| Jun. 3, 2004 | (JP) | 2004-165632 |
| Nov. 26, 2004 | (JP) | 2004-343158 |

(51) Int. Cl.
*G09G 5/00* (2006.01)
(52) U.S. Cl. .................................... 345/156; 341/22
(58) Field of Classification Search ......... 345/156–178; 341/22–26
See application file for complete search history.

(56) References Cited

U.S. PATENT DOCUMENTS

| 4,204,208 | A | * | 5/1980 | McCarthy | 345/551 |
| 5,565,888 | A | * | 10/1996 | Selker | 715/823 |
| 5,764,034 | A | * | 6/1998 | Bowman et al. | 320/155 |
| 6,501,487 | B1 | * | 12/2002 | Taguchi | 715/788 |
| 6,980,199 | B2 | | 12/2005 | Rekimoto | |
| 2002/0091790 | A1 | * | 7/2002 | Cubley | 709/217 |
| 2002/0097227 | A1 | * | 7/2002 | Chu et al. | 345/168 |
| 2003/0030628 | A1 | * | 2/2003 | Sato et al. | 345/173 |
| 2003/0151589 | A1 | | 8/2003 | Bensen et al. | |
| 2005/0259077 | A1 | * | 11/2005 | Adams et al. | 345/163 |

FOREIGN PATENT DOCUMENTS

| JP | 57-184990 | 11/1982 |
| JP | 9-305305 | 11/1997 |
| JP | 11-65769 | 3/1999 |
| JP | 2001-13943 | 1/2001 |
| JP | 2001-113981 | 4/2001 |
| JP | 2002-132239 | 5/2002 |
| JP | 2003-224747 | 8/2003 |
| WO | WO 99/38264 | 7/1999 |
| WO | WO 03/079177 A1 | 9/2003 |

* cited by examiner

*Primary Examiner*—Kevin M Nguyen
*Assistant Examiner*—Cory A Almeida
(74) *Attorney, Agent, or Firm*—Oblon, Spivak, McClelland, Maier & Neustadt, L.L.P.

(57) ABSTRACT

The present invention provides a portable electronic device including an operator block, a display block, detection means, and control means. The operation block has a plurality of operation buttons arranged in matrix. The display block, arranged in the vicinity of the operator block, is capable of displaying a screen divided into a plurality of areas corresponding to the arrangement of the plurality of operation buttons, displaying a cursor for selecting each the areas, and entering the selection by operation of each of the operation buttons. The detection means detects whether any one of the plurality of operation buttons has been operated. The control means positions the cursor to the area corresponding to the detected operation button and displays the cursor on the display block.

7 Claims, 18 Drawing Sheets

| DISPLAY COLOR/ROW DISPLAY LEVEL | 1 | 2 | 3 | 4 | 5 |
|---|---|---|---|---|---|
| NUMBER OF ROWS OF NORMAL COLOR (WHITE) | 5 | 4 | 3 | 2 | 1 |
| NUMBER OF ROWS OF GRAY (LIGHT) | 0 | 1 | 1 | 1 | 1 |
| NUMBER OF ROWS OF GRAY (DARK) | 0 | 0 | 1 | 1 | 1 |
| NUMBER OF SCROLL ROWS | 0-19 | 20 | 21 | 22 | 23- |
| TOTAL NUMBER OF DISPLAY ROWS | 5 | 5 | 5 | 4 | 3 |

$t \rightarrow$

PORTABLE ELECTRONIC DEVICE, DISPLAY METHOD, PROGRAM, AND GRAPHICAL USER INTERFACE THEREOF

BACKGROUND OF THE INVENTION

The present invention relates to a portable electronic device, a display method for displaying content and so on by use of this portable electronic device, a program, and a graphical user interface thereof.

With laptop PCs (Personal Computers) for example, a so-called touch pad is used to move a cursor or a scroll bar on the monitor. On the touch pad, the position of touch of user's finger for example is detected, thereby accordingly displaying the cursor on the monitor. When user's finger for example touches the touch pad, a change takes place in the capacitance of electrodes in the pad, so that the finger position on the pad is detected by sensing this change.

Input devices are known in which a touch pad as described above and operation buttons such as of a keyboard are combined in one unit. To be more specific, a sensor for sensing the above-mentioned capacitance change is arranged below or inside each key of a keyboard (refer to patent document 1 below). Especially, patent document 1 discloses an example in which such an input device is reduced in size to be installed on a mobile phone as shown in FIG. 10 of the document.

[Patent Document 1]
Japanese Patent Laid-open No. 2003-223265 (FIG. 1, FIG. 10, etc.)

SUMMARY OF THE INVENTION

However, unlike the case of desktop PCs using a touch pad, reducing the size of the input device disclosed in patent documents 1 and installing that input device on a portable device separately require operation buttons for moving the cursor and determining the position thereof for example, which requires a space for arranging these operation buttons, thereby making it difficult to reduce the device size still further.

On the other hand, these operation buttons include a button for selecting an area by moving the cursor horizontally or vertically and a button for entering the selected area. Therefore, for the user to position the cursor to each desired area, it is necessary to separately operate these two buttons, thereby increasing the number of times operations must be made, which makes it difficult for the user to execute intuitive operations.

It is therefore an object of the present invention to provide a portable electronic device, a display method, a program, and a graphical user interface thereof that allow intuitive operations of the portable electronic device with the relatively small number of operations, while achieving the reduction in size of the portable electronic device.

In carrying out the invention and according to one aspect thereof, there is provided a portable electronic device including: an operator block having a plurality of operation buttons arranged in matrix; a display block, arranged in the vicinity of the operator block, capable of displaying a screen divided into a plurality of areas corresponding to the arrangement of the plurality of operation buttons, displaying a cursor for selecting each the areas, and entering the selection by operation of each of the operation buttons; detection means for detecting whether any one of the plurality of operation buttons has been operated; and control means for positioning the cursor to the area corresponding to the detected operation button and displaying the cursor on the display block.

In the above description, the phase "corresponding to" denotes not only relating one operation button with one area, but also relating one area with a plurality of operation buttons. For example, one area may be related to two operation buttons. In this case, operating one of the two buttons may select the related area and enter the selection.

In the present invention, the display block is arranged in the vicinity of the operator block. The position of the operation button corresponds to the position of the cursor displayed on the display block. The user is able to check the position of cursor by looking at the display block while operating an operation button. In response to the movement of user's finger, cursor moves to a desired item. Consequently, the user is able to intuitively operate the operation button to select each item and enter the selection. In addition, because there is no need for separately arranging controls for selecting each time and entering the selection, the present invention is suitably applicable to the reduction of the physical size of a portable electronic device. The arrangement of operation buttons in a matrix sometimes makes the user difficult to operate. This problem is overcome by the embodiments of the present invention because the embodiments allow the user to operate intuitively and with the relatively small number of steps.

The above-mentioned portable electronic device further includes item display control means for relating an object indicative of an item selected by the cursor and entered with a predetermined function executable by the portable electronic device and arranging the object in the area to be displayed on the display block. Consequently, when selecting an object and entering the selection, the user may only select the operation button at the position corresponding to the area in which the object is displayed and enter the selection, thereby allowing the user to have an intuitive operation. "Object" herein used denotes an imaged item that is displayed on the display block and is subject to selection or entry. The object includes a button screen for example and imaged items included in a list search screen. "Predetermined function" herein used denotes a function for guiding the user to or from a particular one of a plurality of operation screens (a function operable by a navigation button to be described later), a function for controlling the reproduction of entered content data (a function operable by a reproduction control button to be described later), and a function for controlling the sequence of reproduction of content data (a function operable by a context button to be described later). However, the predetermined function is not limited to these three; for example, a function for setting the portable electronic device in a various manners, a function for displaying images taken with a digital camera onto the display block, and other functions executable by the portable electronic device are included.

In the above-mentioned portable electronic device, the item display control means is cable of executing control to change a color of the object and display the object of the changed color in accordance with a predetermined operation level. "Operation level" herein used includes levels at which an object has not yet been selected, an object has been selected, and a selected object has been entered. Each object is colored in a different manner in accordance with each operation level, allowing the user to identify the operation level in an intuitive manner.

In the above-mentioned portable electronic device, the detection means is capable of detecting distinction between a first state in which the operation button is touched by user and a second state in which the operation button is pressed by user. This configuration allows the user to execute various operations with one operation button, so that the prevent invention is suitable to the reduction of the physical size of the portable electronic device. Further, the detection means may detect distinction between an operation in which the operation button is released by user from the first state and an operation in which the operation button is returned by user from the second state to the first state. This configuration allows the user to execute more various operations.

In the above-mentioned portable electronic device, the item display control means has image display means for displaying an image symbolizing content to be reproduced and control means for executing control such that the content is reproduced when the image is selected and the selection is entered by user. "Content to be reproduced" herein used denotes a song, a video, or a movie. "An image symbolizing content to be reproduced" herein used includes a jacket image of a CD containing songs if the content to be reproduced is songs and a jacket image of a DVD or a videotape if the content to be reproduced is a movie. In the present invention, content is reproduced when the user selects a corresponding image and enters the selection, so that, when reproducing a song contained in a CD for example, the user may select the jacket image of that CD from among the jacket images shown on the display block, thereby intuitively reproducing the desired song.

Meanwhile, because the area of the display block is relatively limited on the portable electronic device, jacket images must be displayed in a relatively small display area, thereby making it sometimes difficult to easily select jacket images.

To overcome the above-mentioned problem, the above-mentioned image display means has zoom-in display means for displaying the image when the detection means detects the first state in excess of a predetermined period of time. "Predetermined period of time" herein used is, but not exclusively, about 0.1 second. This configuration allows the display of each jacket image in a zoomed-in manner, so that the user is able to easily execute an intuitive selecting operation.

In the above-mentioned portable electronic device, the item display control means has scroll display control means for executing control such that the image is displayed in scroll when the detection means detects the first state in excess of a predetermined period of time. Consequently, the screen may be scrolled only by user's continuing touching the operation button, thereby resulting in an easy scroll operation. Especially, as compared with the scrolling by continuing the state in which an operation button is kept pressed, the scrolling effected by only the continuation of touch according to the present invention mitigates the load of user's finger for scrolling. "Predetermined period of time" is, but not exclusively, 0.5 to 1.0 second.

In the above-mentioned portable electronic device, the scroll display control means executes scroll display when the detection means detects that at least one of the operation buttons that is in one of an end row and an end column is touched by user. For example, the scroll display control means execute control such that the screen is scrolled upward when the user touches the bottom row in the screen, thereby enhancing the intuition of operation.

With portable electronic devices, the internal bus rate and drawing capabilities are limited, so that the above-mentioned scroll display is not speeded up beyond a certain level. Therefore, if the user wants to quickly check many pieces of information by scroll display, some inconvenience may take place.

Therefore, in order to overcome the above-mentioned problem, the item display control means displays the object by a first number of objects on a row or column basis and the scroll display control means has change means for changing the number of objects to be displayed in scroll from the first number of objects to a second number of objects smaller than the first number of objects when the screen has been scrolled by one of a predetermined number of rows and a predetermined number of columns. The first number is five for example and the second number is three for example, but not exclusively. By reducing the number of objects that are scroll-displayed on a row or column basis, the amount of data may be reduced to eventually enhance the scroll speed, thereby allowing the user to quickly check desired objects.

The above-mentioned change means may gradually change the above-mentioned number of objects from the first number to the second number. Gradually changing the number of objects allows the user to naturally recognize the gradual increase in the scroll speed.

The above-mentioned change means may gradually change a color of the object to a color higher in brightness toward the scroll direction in synchronization with the gradual change in the number of objects. For example, if the color of the object before changing of the number of objects is white, the object in the end row or column in the scroll direction is displayed white. The color of each object is changed from white to light gray to dark gray for example as the distance grows from the object in the end row or column. This configuration allows the user to easily recognize the gradual increase in scroll speed without use of complicated animation.

In carrying out the invention and according to another aspect thereof, there is provided a display method including the steps of: displaying a screen divided into a plurality of areas so as to correspond to a matrix arrangement of a plurality of operation buttons disposed on an operator block; displaying a cursor for selecting each of the areas and entering the selection when each of the operation buttons is operated onto a display block arranged in the vicinity of the operator block; detecting which of the plurality of operation buttons has been operated; and positioning the cursor to the area corresponding to the detected operation button and displaying the cursor on the display block.

In carrying out the invention and according to still another aspect thereof, there is provided a program for making a portable electronic device executing the steps of: displaying a screen divided into a plurality of areas so as to correspond to a matrix arrangement of a plurality of operation buttons disposed on an operator block; displaying a cursor for selecting each of the areas and entering the selection when each of the operation buttons is operated onto a display block arranged in the vicinity of the operator block; detecting which of the plurality of operation buttons has been operated; and positioning the cursor to the area corresponding to the detected operation button and displaying the cursor on the display block.

In carrying out the invention and according to yet another aspect thereof, there is provided a graphical user interface for use in a portable electronic device including: a screen divided into a plurality of areas so as to correspond to a matrix arrangement of a plurality of operation buttons disposed on an operator block; and a cursor for selecting each of the areas and entering the selection in accordance with a detection signal of a sensor for detecting which of the plurality of operation buttons has been operated by user.

The above-mentioned graphical user interface further including: an object indicative of an item to be selected by the cursor for entering, the object being related with a predetermined function executable by the portable electronic device to be allocated to each of the areas.

In the above-mentioned graphical user interface, the sensor makes detection by making distinction between a first state in which user touches the operation button and a second state in which the operation button is pressed by user. The change of the object means the changes in color, shape, pattern, and blinking state (blinking interval) of the object.

As described and according to the invention, devices may be operated with the relatively small number of operations and in an intuitive manner, while achieving the reduction of devices in size.

BRIEF DESCRIPTION OF THE DRAWINGS

These and other objects of the present invention will be seen by reference to the description, taken in connection with the accompanying drawings, in which.

DETAILED DESCRIPTION OF THE PREFERRED EMBODIMENTS

The following describes embodiments of invention with reference to accompanying drawings.

Figure 1:
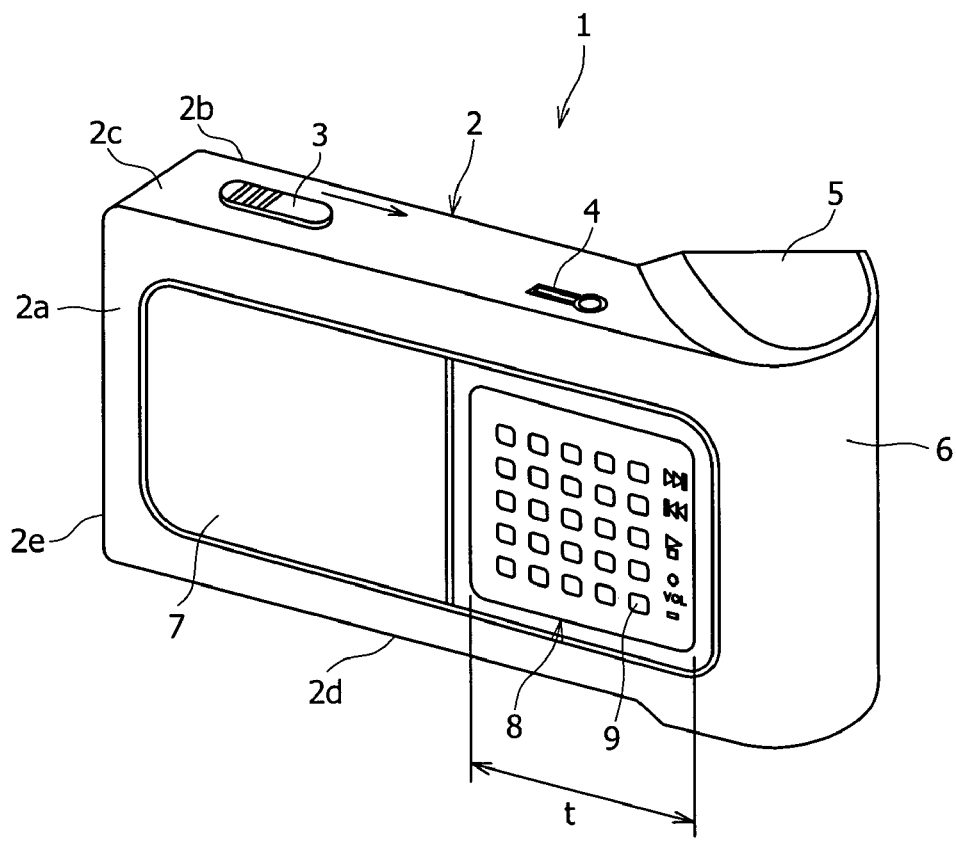
FIG. 1 is a perspective view of a portable electronic device practiced as one embodiment of the invention.
Figure 2:
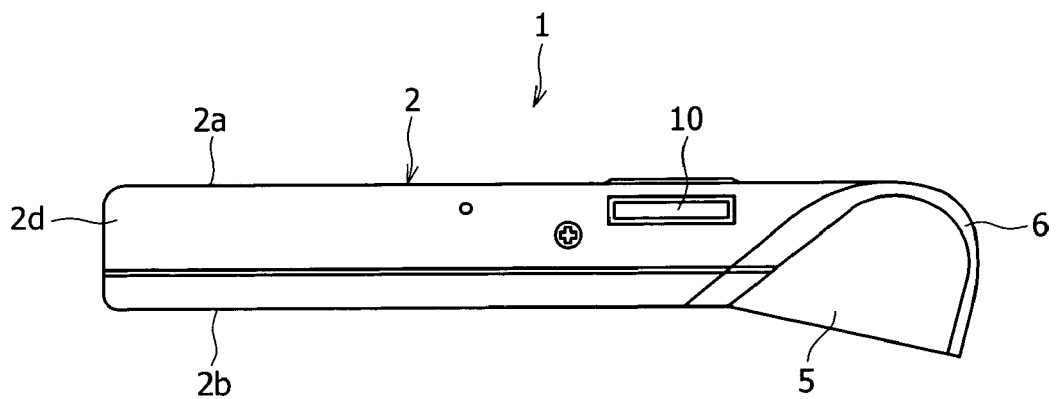
FIG. 2 is a bottom view of the portable electronic device shown in FIG. 1.

Now, referring to FIG. 1, there is shown, in a perspective view, a portable electronic device practiced as one embodiment of the invention. Referring to FIG. 2, there is shown a bottom view of the portable electronic device shown in FIG. 1.

A portable electronic device 1 incorporates a HDD (Hard Disk Drive) for example, not shown, and is capable of reproduce music data stored in the HDD. On a front surface 2a of a main body 2 of the portable electronic device 1, a display block 7 and an operator block 8 are arranged. The display block 7 shows images, and the operator block 8 is by the display block 7. On one end of the main body 2, a grip block 6 that is gripped by the user is arranged. On the operator block 8, operation buttons 9 are arranged in a matrix within a rectangular area each side being 4 to 5 cm wide for example. The display block 7 is based on a liquid crystal display or an organic electro-luminescence device for example.

The grip block 6 has a projecting portion 5 projecting from a rear surface 2b of the main body 2. The projecting portion 5 houses a battery. Because the battery is relatively large in weight among the components of the portable electronic device 1, so that incorporating the battery in the grip block 6 provides the proximity of the grip block 6 with the center of gravity of the portable electronic device 1, thereby providing the user with the sense of stability when holding the main body 2.

On a top surface 2c of the main body 2, a power switch 3 and a remote commander jack 4 are arranged. The user is able to slide the power switch 3 in the arrow direction for example to turn on/off the power to the portable electronic device 1. To the remote commander jack 4, a remote commander, not shown, is connected. Through the remote commander, the user is able to execute operations such as music selection, reproduction, fast forward, and rewind, for example. On a side surface 2e of the main body 2, an audio output terminal is arranged to which a year phone or headphones, not shown, is connected.

Figure 3:
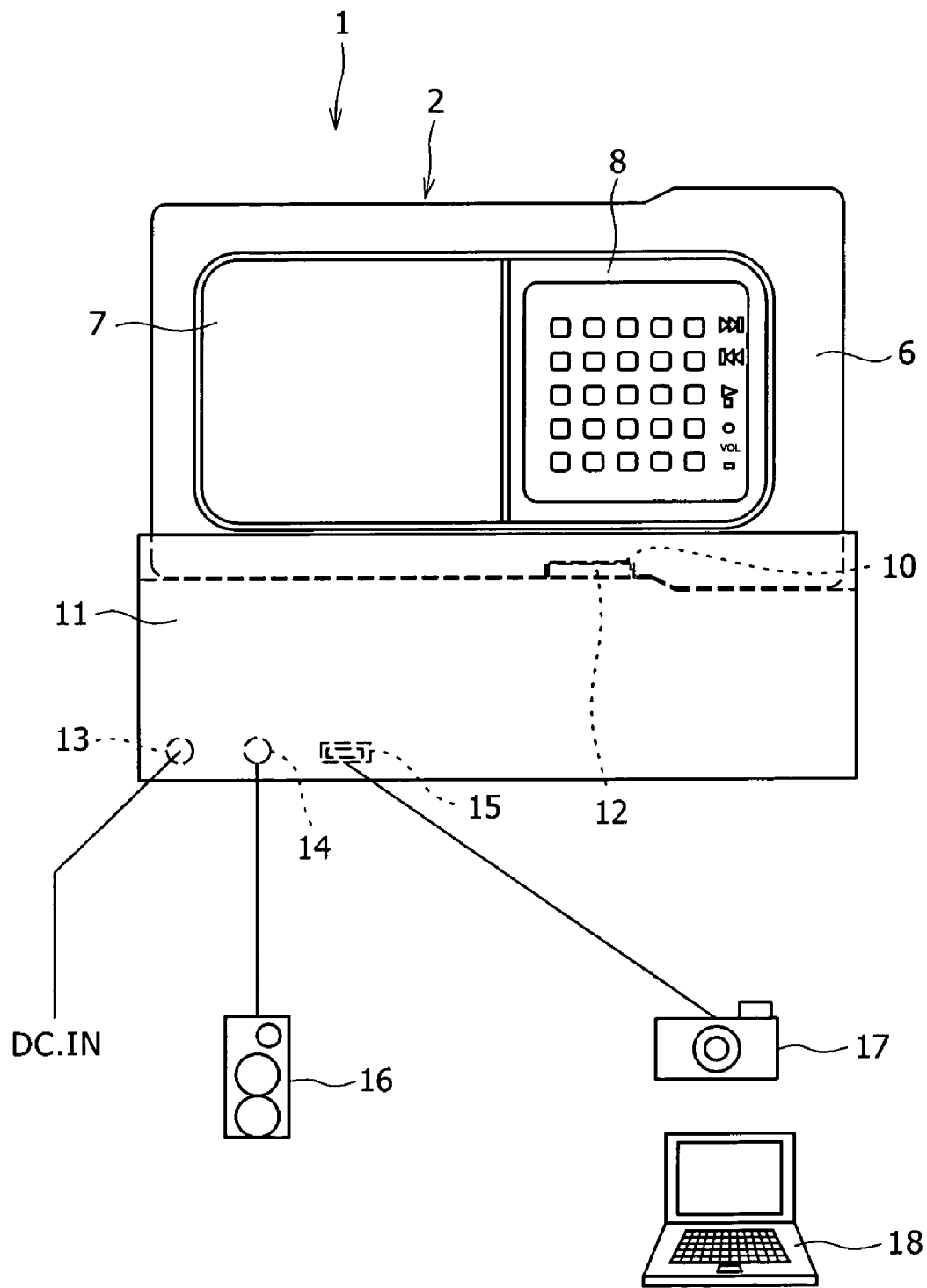
FIG. 3 is a front view of the portable electronic device shown in FIG. 1 in a state where the device is installed on its cradle.

Referring to FIG. 3, there is shown a front view in which the main body 2 is shown in a state of resting on its cradle 11. On the rear side of this cradle 11, a connection port 13 for a power supply plug, an external output port 14 for outputting music data and so on recorded to the portable electronic device 1 to a speaker 16 for example, and a USB (Universal Serial Bus) port 15 through which a PC 18 or a digital camera 17 for example is connected are arranged, for example. As shown in FIGS. 2 and 3, on a bottom surface 2d of the main body 2 of the portable electronic device 1, a connecter 10 is arranged. When the connector 10 is physically connected to a connector 12 arranged on the cradle 11 with the main body 2 installed on the cradle 11, the power is supplied to the portable electronic device 1 through the cradle 11 or music data for example is downloaded from the PC 18. In this case, the music data is compressed by a transfer application program of the PC 18 and the compressed music data is received by the portable electronic device 1 to be recorded on its hard disk drive. A data compression algorithm used includes, but not exclusively, MPEG (Moving Picture Experts Group) or ATRAC (Adaptive TRansform Acoustic Coding) for example.

Figure 4:
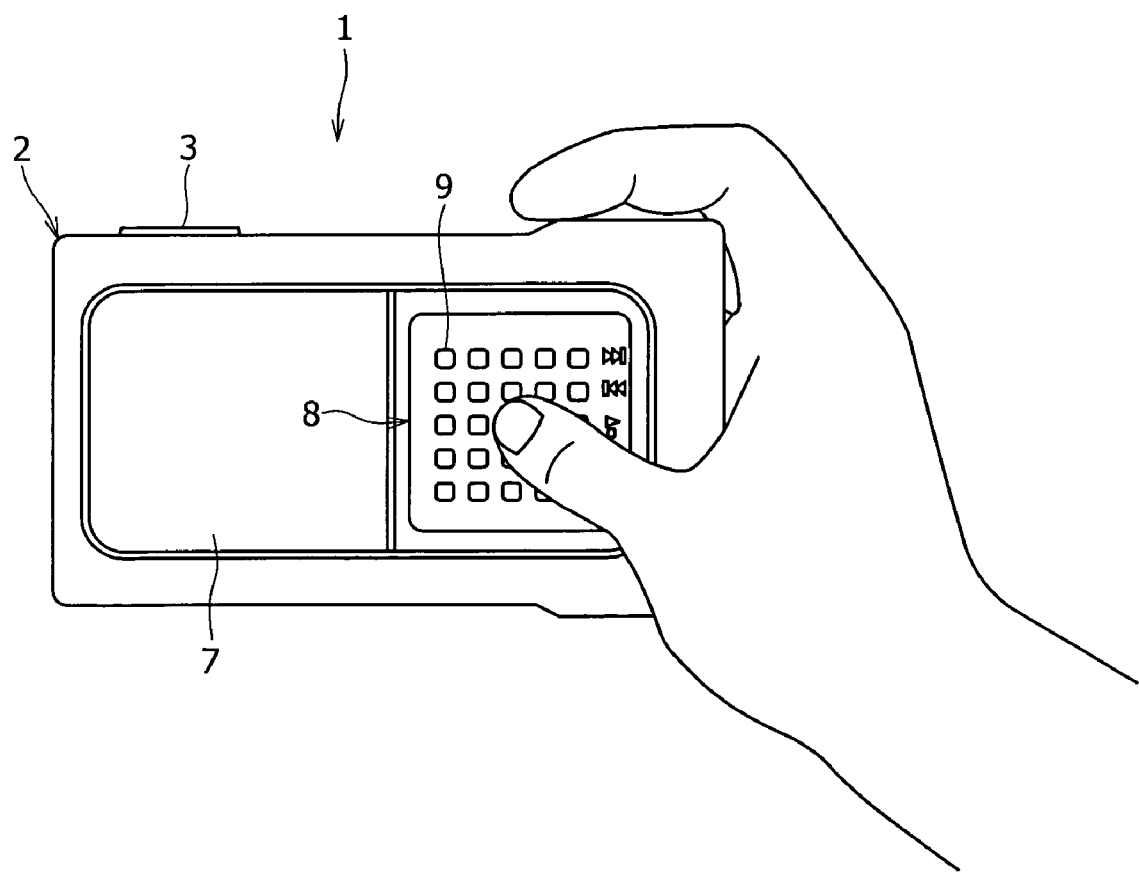
FIG. 4 is a front view of the portable electronic device shown in FIG. 1 in a state where the device is held in the hand.

Referring to FIG. 4, there is shown the portable electronic device 1 as held by the hand of the user. As shown, the user is able to grip the grip block 6 to operate the operator block 8 with the thumb.

Figure 5:
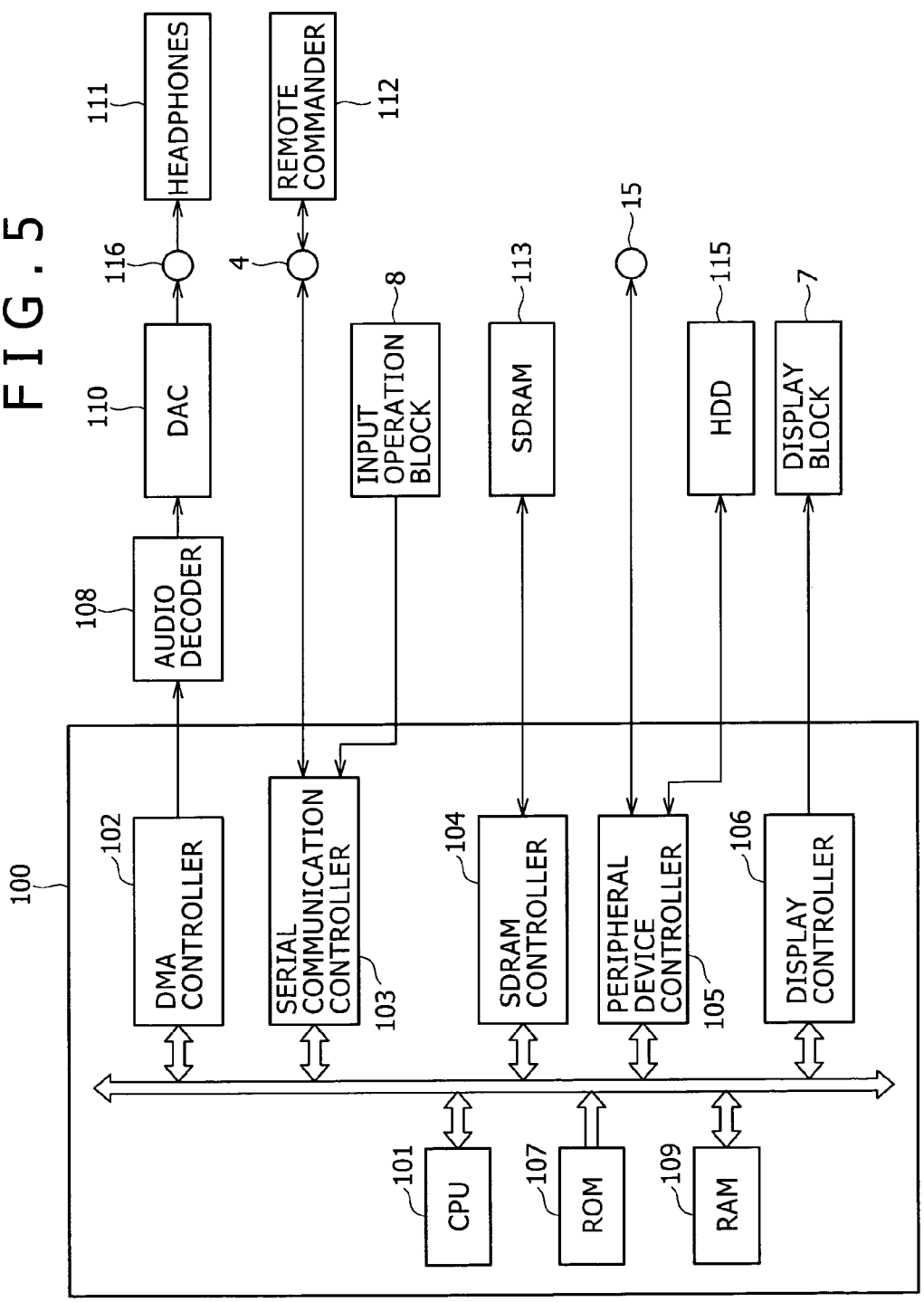
FIG. 5 is a block diagram illustrating a system configuration of the portable electronic device shown in FIG. 1.

Referring to FIG. 5, there is shown a system configuration of the portable electronic device 1.

A system controller 100 has a CPU (Central Processing Unit) 101, a ROM (Read Only Memory) 107, a RAM (Random Access Memory) 109, a DMA (Direct Memory Access) controller 102, a serial communication controller 103, an SDRAM (Synchronous Dynamic RAM) controller 104, a peripheral device controller 105, and a display controller 106.

The CPU 101 controls the system controller 100 in its entirety, thereby executing various kinds of computational and control operations by use of the RAM 109 as a work area by means of firmware stored in the ROM 107 for example. For this firmware, a system bootup program and a bootup checksum program for example are stored in the ROM 107. The DMA controller 102 DMA-transfers music data so as to output the music data from a HDD 115 to the outside through an audio output terminal 116. The serial communication controller 103 provides an interface for controlling the inputs transmitted from a remote commander 112 or the operator block 8 for example. The SDRAM controller 104 controls the amount of data to be stored in an SDRAM 113 and the timing of data output operations, for example.

The SDRAM 113 is a buffer for temporarily storing mainly music data extracted from the HDD 115. The music data stored in the SDRAM 113 is decoded by an audio decoder 108 via the DMA controller 102 and the decoded music data is converted by a DA (Digital to Analog) converter 110 into analog data, which is outputted to headphones 111 via the audio output terminal 116.

The peripheral device controller 105 controls the input/output of data with the HDD 115 and the USB port 15. The display controller 106 controls the display of images on the display block 7. The display controller 106 controls images to be displayed in accordance with signals entered through the operator block 8, under the control of the CPU 101.

Figure 6:
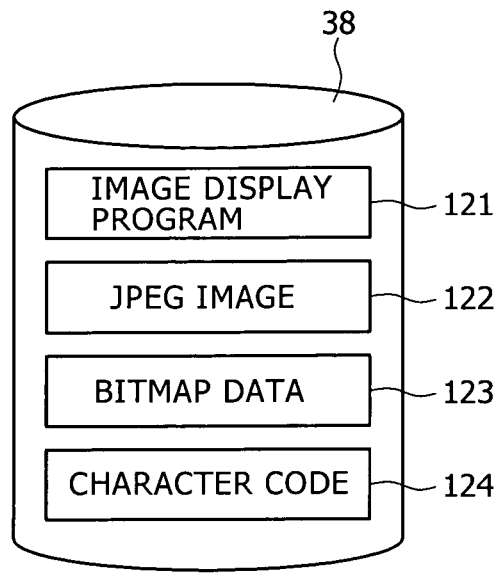
FIG. 6 illustrates data stored in a hard disk drive.

Referring to FIG. 6, there is shown the data stored in a hard disk 38 of the HDD 115. The hard disk 38 stores an image display program 121, JPEG (Joint Photographic Expert Group) images 122, bitmap data 123, and character codes 124, for example. The image display program 121 displays various kinds of images on the display block 7; to be more specific the image display program 121 executes all image and screen display operations, such as cursor display, coloring of cursor-selected items, and scroll display to be described later for example, in accordance with inputs entered through the operator block 8 by the user, for example. JPEG images 122 are displayed on a reproduction screen (refer to FIG. 15) to be described later when it is displayed. JPEG images 122 are also used when displaying images of album jackets for example. The image display program 121 provides a graphical user interface. The bitmap data 123 constitute data to be displayed on the display block 7; for example, the bitmap data 123 include data for representing music title 50 shown in FIG. 15 and artist name shown in FIG. 14, for example. The character codes 124 are used to convert character information for display the music title 50 into bitmap data when a command is issued to display the music title 50 for example on the display block 7 by the system controller 100. It should be noted that the image display program 121, the bitmap data 123, and the character codes 124 may be stored in the ROM 107.

Figure 7:
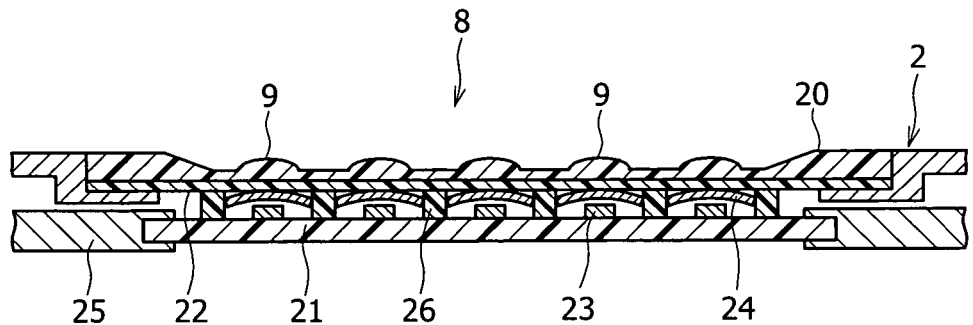
FIG. 7 is a sectional view illustrating a configuration of an operator block.

Referring to FIG. 7, there is shown a cross section of the operator block 8.

The operation button 9 of the operator block 8 is formed integrally with a sheet 20 made of resin for example. This sheet 20 and a sheet 22 for detecting the touch of user's finger onto the sheet 20 are attached to a cover member of the main body 2. Below the sheet 20 and the sheet 22, a circuit board 21 for controlling the operator block 8 is arranged as supported by a support 25. The circuit board 21 and the sheet 22 are attached to each other with a double-stick tape 26 for example.

Figure 8:
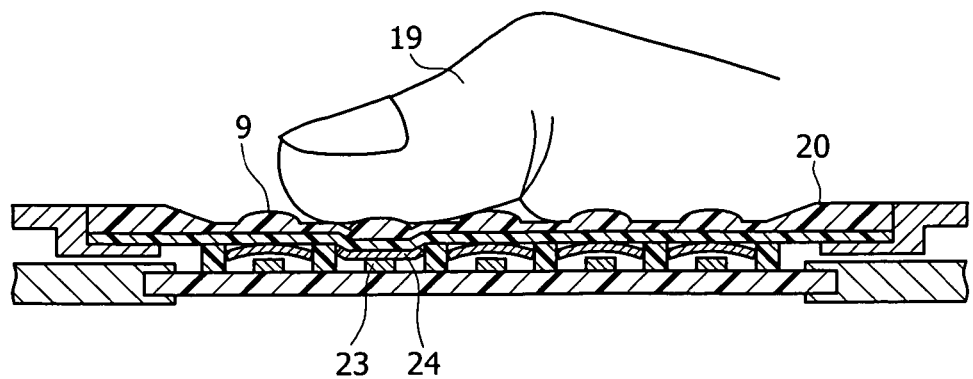
FIG. 8 is a sectional view illustrating the operator block shown in FIG. 7 in a state where an operation button is pressed by a finger of a user.

An electrode 24 is arranged below the sheet 22 for each operation button 9. A wiring 23 is arranged for each electrode 24 on the circuit board 21. The electrode 24 and the wiring 23 form a touch-sensitive switch. The electrode 24 and the wiring 23 are connected to a controller, not shown, for controlling this operator block 8. When the operation button 9 is pressed by the user's thumb 19 for example as shown in FIG. 8 with a predetermined voltage applied to the electrode 24 or the wiring 23, the switch conducts, which causes the controller to determine that the operation button 9 has been pressed. The electrode 24 is formed in the shape of a cup for example and has elasticity; when the pressing of the operation button 9 is released, the electrode 24 returns to the state shown in FIG. 7. It should be noted that, instead of providing elasticity to the electrode 24 itself, a spring or rubber cup for example may be installed on the electrode 24 to give elasticity.

Figure 9:
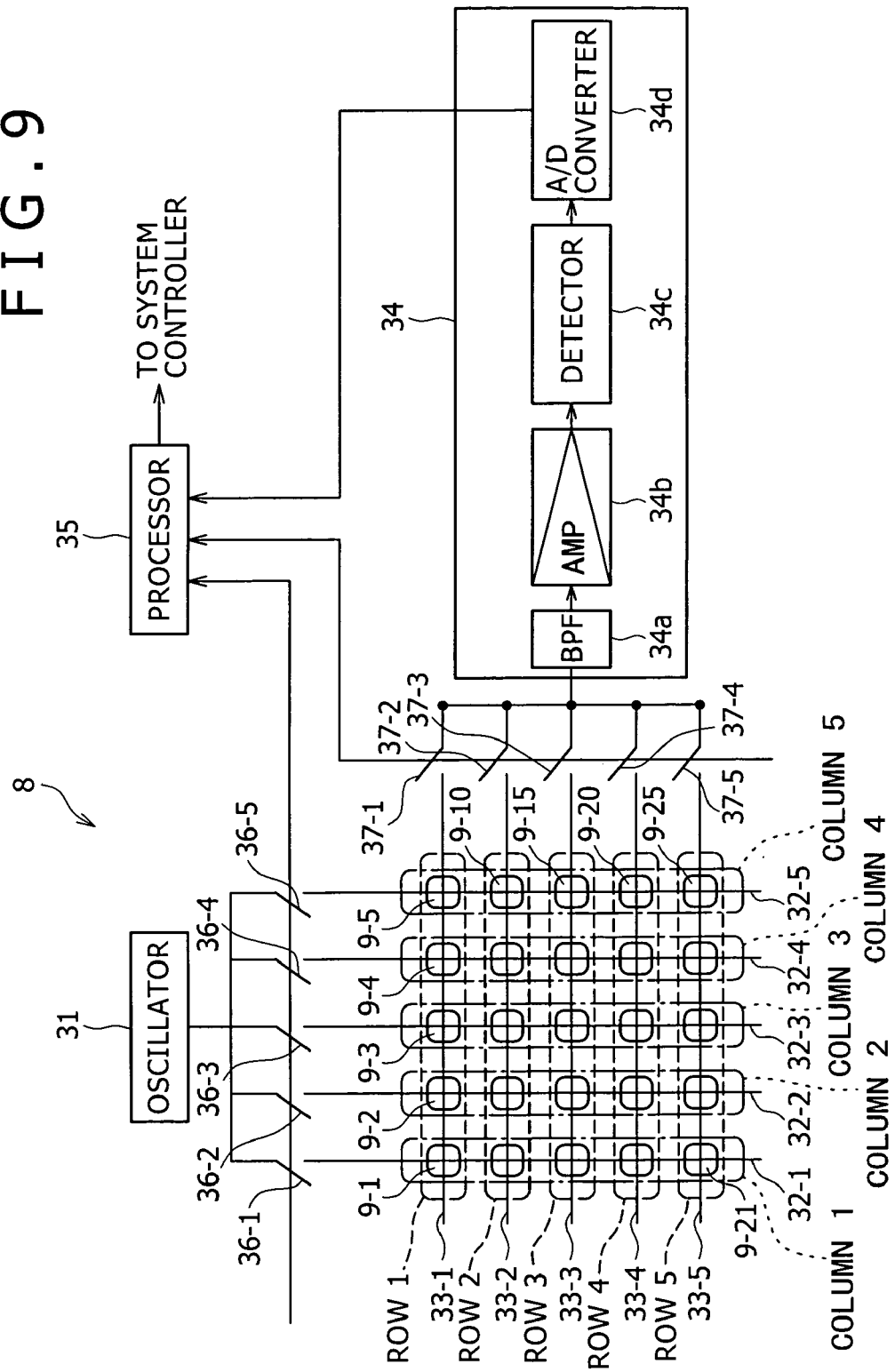
FIG. 9 is a schematic diagram illustrating the operator block shown in FIG. 7.

Referring to FIG. 9, there is shown an exemplary configuration of the operator block 8.

The operator block 8 is made up of linear transmission electrodes 32-1 through 32-5, an oscillator 31 for supplying an alternate current having a predetermined frequency (100 KHz for example) for transmission, linear reception electrodes 33-1 through 33-5 for receiving the alternate current from the transmission electrodes 32-1 through 32-5 by the electrostatic effect, a receiver 34 for receiving the alternate current that flows through the reception electrodes 33-1 through 33-5, and a processor 35 for inputting the output of the oscillator 31, the output of the reception electrodes 33-1 through 33-5, and the output of the receiver 34.

The sheet 22 is arranged with switches 36-1 through 36-5 between the oscillator 31 and the transmission electrodes 32-1 through 32-5. In addition, switches 37-1 through 37-5 are arranged between the reception electrodes 33-1 through 33-5 and the receiver 34. These switches 36-1 through 36-5 and switches 37-1 through 37-5 turn on in a predetermined timed relation (for example, every time the oscillator 31 outputs an alternate current).

The receiver 34 is made up of a AM modulator based on a bandpass filter (BPF) 34a for passing only the alternate current having a predetermined frequency, a amplifier 34b, and a frequency detector 34c, and an A/D converter 34d for converting the detected output of the AM modulator into a digital signal.

The reception electrodes 33-1 through 33-5 are arranged relative to the transmission electrodes 32-1 through 32-5 in an approximately orthogonal manner and have each a point of intersection. At each point of intersection, however, these electrodes are not in touch with each other. In other words, a capacitor is formed at each intersection point between the transmission electrode 32 and the reception electrode 33. Therefore, when the alternate current generated and outputted by the oscillator 31 is supplied to the transmission electrode 32, the alternate current flows through the corresponding reception electrode 33 by electrostatic induction via the intersection point (or the capacitor).

When the oscillator 31 applies an alternate current to the transmission electrode 32, an alternate current is generated on the reception electrode 33 on the basis of the capacity coupling of the capacitor between the transmission electrode 32 and the reception electrode 33 and the generated alternate current is supplied to the receiver 34.

The receiver 34 outputs the intensity of the alternate current received via the capacitor to the processor 35 as a digital signal. The intensity of the alternate current received by the receiver 34 via the capacitor depends only on the capacitance of the capacitor. The capacitance of the capacitor keeps a static, fixed value unless there is deformation for example on the transmission electrode 32 or the reception electrode 33. Therefore, as far as the same alternate current is applied to the transmission electrode 32, the intensity of the alternate current received by the receiver 34 via the capacitor is constant.

It should be noted here that, if the living body (user's finger for example) comes in proximity of the intersection point between the transmission electrode 32 and the reception electrode 33, a change occurs in the capacitance by the capacitor at that intersection point. Because the living body may be regarded as virtual grounding, if an alternate current is applied to the transmission electrode 32, the intensity of an alternate current received by the reception electrode 33 via the capacitor and supplied to the receiver 34 is lowered an amount equivalent to a current that flows into ground (or the living body).

Based on the above-mentioned operation, the processor 35 determines whether the living body is in the proximity of the intersection point between the electrodes or measures how near the living body to the intersection point (or the distance between the living body and the intersection point) by use of a reception signal that was AM-modulated by the AM modulator of the receiver 34 and converted by the A/D converter 34*d*.

Therefore, if each of the plurality of operation buttons 9-1 through 9-25 arranged in a matrix is arranged on each of the intersection points, touching the operation button 9-*i* with the user's finger causes the processor 35 to detect that the living body is in the proximity of the operation button 9-*i* (or the intersection point below this button), supplying a detection signal to the CPU 101.

Thus, on the operator block 8, a detection signal indicative of the state where the user's finger is in touch with the sheet 20 ("touched" state to be described later) is determined separately from a detection signal indicative of the state where the operation button 9 is pressed ("pressed" state to be described later).

In an example shown in FIG. 9, because the operation buttons 9-1 through 9-25 are arranged in a matrix of 5 rows×5 columns, five reception electrodes 33-1 through 33-5 and five transmission electrodes 32-1 through 32-5 are arranged; however, the number of transmission electrodes 32 and the number of reception electrodes 33 are not limited thereto. Preferably, the transmission electrode 32 and the reception electrode 33 are arranged such that one intersection point is always arranged below each operation button.

In the example shown in FIG. 9, an angle formed between the transmission electrode 32 and the reception electrode 33 at each intersection point is, but not exclusively, approximately 90 degrees. The transmission electrode 32 and the reception electrode 33 may be arranged in any manner as far as these electrodes do not come in touch with each other and an intersection point is formed therebetween.

The following describes basic operations to be executed on the operator block 8.

The user operates the operator block 8 with the finger in the following eight manners.

(1) "Touch": the user's finger touches the operation button 9 from the start where the user's finger is not in touch with the sheet 20 (or the operation button 9).

(2) "Long touch": the user's finger is kept touched with the operation button 9 for a certain period of time.

(3) "Move": with the user's finger kept on the sheet 20, the user's finger moves to another operation button 9.

(4) "Press": the user's finger presses one of the 25 operation buttons 9 (thereby making the electrode 24 and the wiring 23 conduct).

(5) "Long press": the user's finger kept pressing one of the 25 operation buttons 9 for a certain period of time.

(6) "Drag": with the user's finger pressing one of the 25 operation buttons 9, the user's finger moves to another operation button 9 (the user's finger moves pressing any operation buttons 9 along the course to the target operation button).

(7) "Release": the user's finger is released from the pressing state (and the user's finger is still in touch with the operation button 9).

(8) "Remove": the user's finger is detached from the operation button 9.

The above-mentioned eight operations are mainly used for the following purposes.

"Touch" is used, when displaying a navigation button, a reproduction control button, or a context button to be described later onto the display block 7, to "select" or "focus" one of a plurality of areas (or items) displayed on the screen, for example.

"Press" is used to "enter" the selected item from the "touch" state.

"Long touch" is used to scroll the screen up and down, for example. This scroll operation may also be made by operating the navigation button. The period of time for "Long touch" is, but not exclusively, 0.5 to 1.0 second for example.

"Move" is used to move from a touched and "selected" item to another to "select" it.

"Long press" is used to display the context button onto the display block 7 when executing trick play operations such as "fast forward" and "rewind" of music by operating the reproduction control button to be described later. The period of time for a long press operation is, but not exclusively, 0.5 to 1.0 second for example.

"Drag" is used to remove the user's finger from a pressed operation button 9, while still pressing the sheet 20, to cancel the pressing thereof.

"Remove" is used to cancel a touched and "selected" item.

"Release" is used to kick an "enter" command by pressing. Only when the user's finger is released, an "enter" command is given. After this "enter" has been made, the portable electronic device 1 executes no operation if the user's finger is detached from the operation button 9, or the user's finger is removed.

The following describes screens to be displayed by the portable electronic device 1 onto the display block 7.

Figure 10:
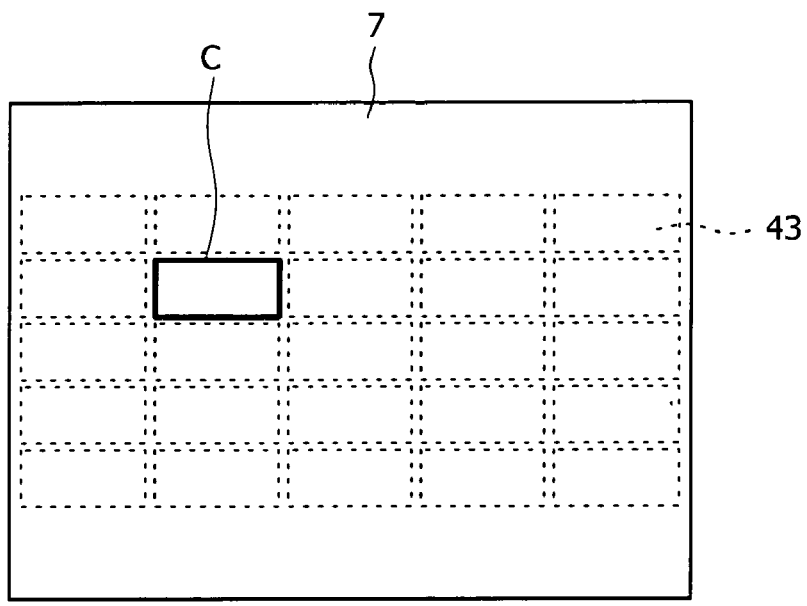
FIG. 10 illustrates an image shown on a display block.

Referring to FIG. 10, there is shown a diagram for describing an image that is displayed on the display block 7. As shown, an item (or an area) 43 that is selected and entered by the user is displayed as divided into a matrix of five rows and five columns for example so as to correspond to the operation buttons 9 of the operator block 8. Operating the operator block 8, the user is able to select and enter desired items by moving cursor C thereto.

Figure 18:
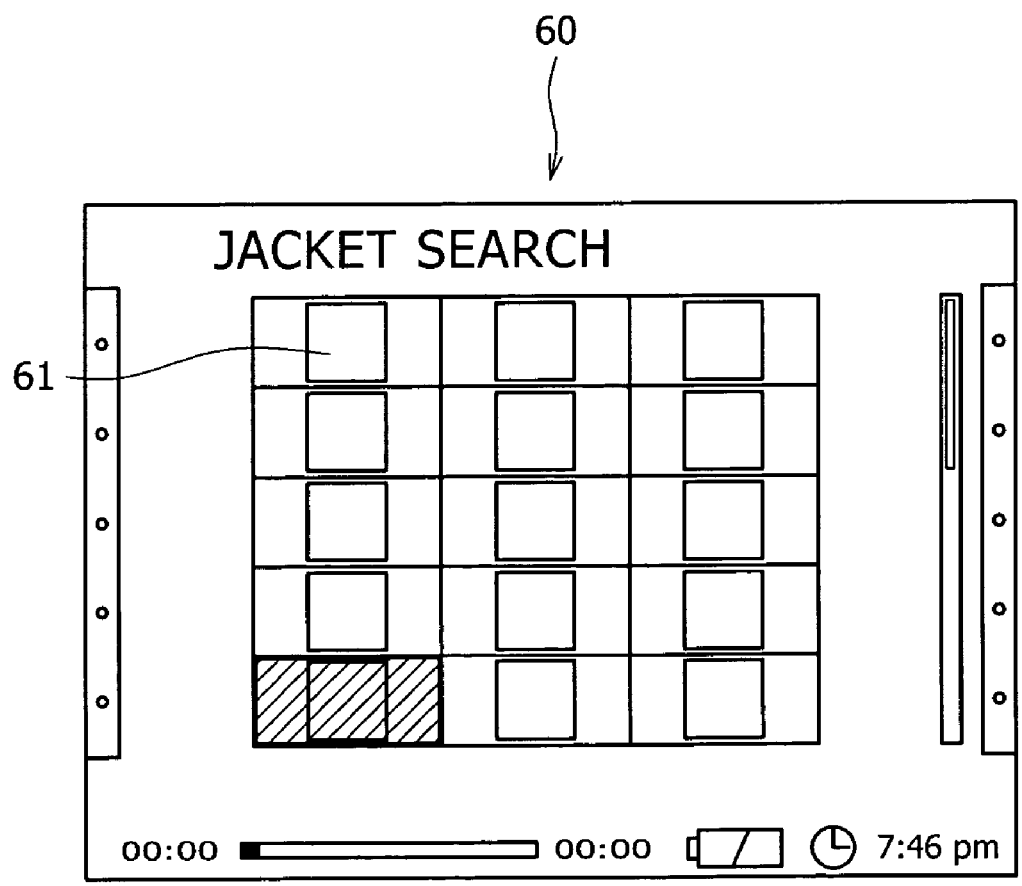
FIG. 18 illustrates a jacket search screen.

The portable electronic device 1 displays three basic screens on the display block 7. These are (1) a reproduction screen (a JPEG display screen) as shown in FIG. 15), (2) list select screens (a main menu screen, a search screen, a programmed reproduction list screen, and a setting screen) as shown in FIGS. 11 through 14, and (3) a matrix select screen (an album jacket search screen) as shown in FIG. 18, for example.

In addition, the portable electronic device 1 displays three basic button screens on the display block 7. These are (a) the navigation button, (b) the reproduction control button, and (c) the context button as described above.

The navigation button is used in all screens (1), (2), and (3) shown above. The navigation button includes a button for switching between the above-mentioned reproduction screen, the above-mentioned main menu screen, and other screens, a button for sorting music titles displayed on the screen (in the order of alphabets, user preferences, etc.) and buttons for moving to a next page and returning to a previous page, for example.

The reproduction control button is shown on the above-mentioned reproduction screen. The reproduction control button includes buttons for cueing, fast forward, rewind, and skip during music reproduction, for example.

The context button is shown in the list select screen and the matrix select screen mentioned above. The context button includes a button for adding music to a programmed reproduction list. Especially, with the programmed reproduction list screen, the context button includes buttons for deleting music from the list and exchanging music.

On the list select screen, subjects of selection (or items) are divided only by row on the display screen, while, on the matrix select screen, items are divided by row and column (or in a matrix manner) on the display screen. Therefore, both the select screens are different only in images to be displayed but remain the same in the purpose of selecting and entering items to start reproduction and selecting items to display the context button to create a programmed reproduction list and so on.

A programmed reproduction list is used to additionally listing pieces of music that the user wants to listen to and reproduce the listed pieces of music in that order. Up to five programmed reproduction lists for example may be registered. The user is able to select and enter through the setting screen any of the five programmed reproduction lists.

The following describes operations of the portable electronic device 1. First, an operation of the portable electronic device 1 for music reproduction will be described.

Figure 19:
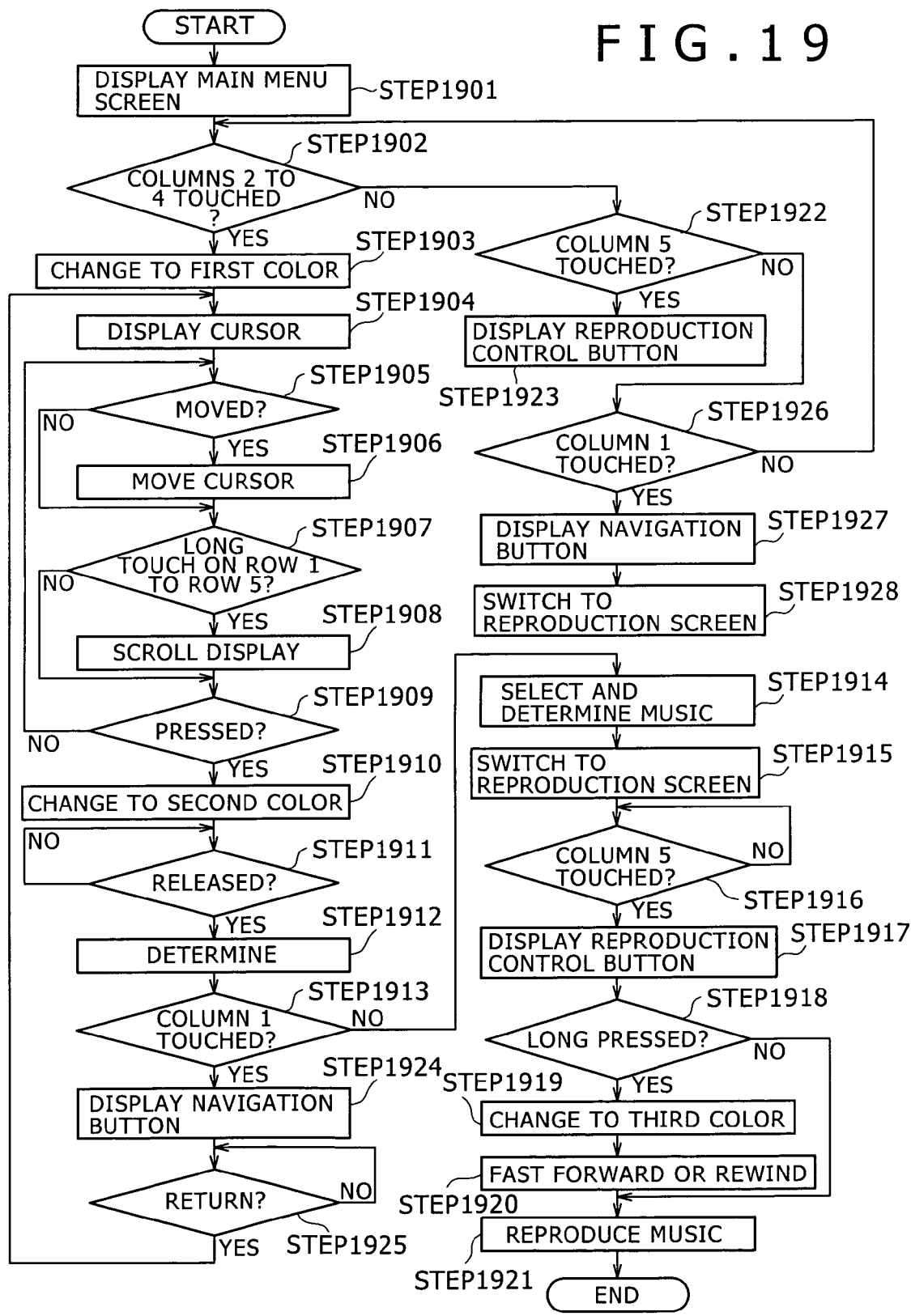
FIG. 19 is a flowchart indicative of an exemplary operation of the portable electronic device shown in FIG. 1.

Referring to FIG. 19, there is shown a flowchart indicative of the operation of the portable electronic device 1.

Figure 11:
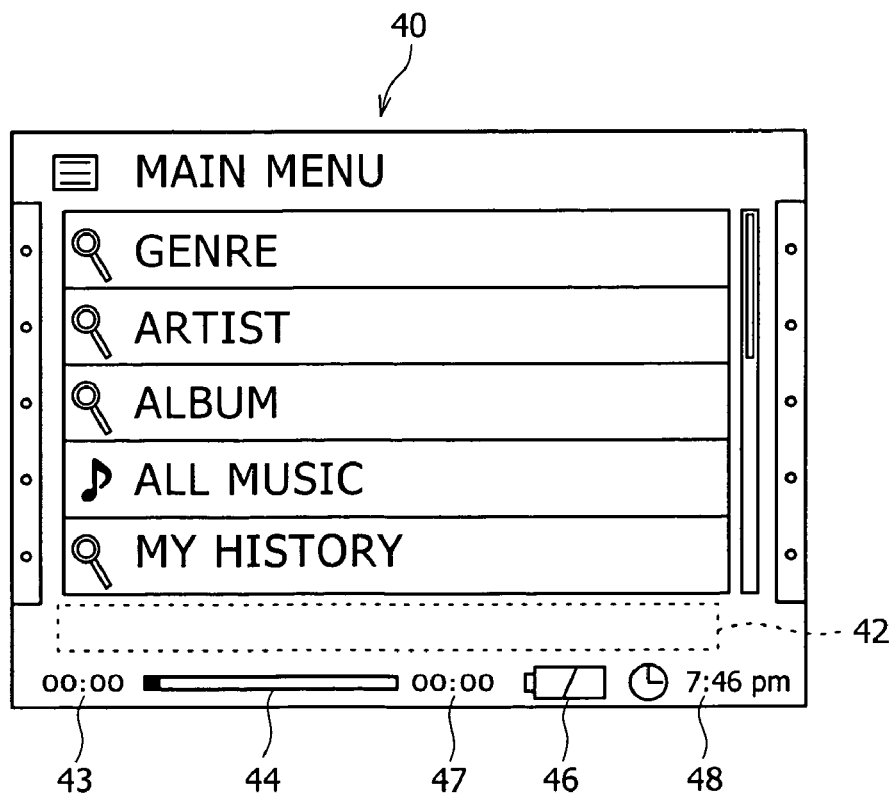
FIG. 11 illustrates an exemplary main menu screen.

When the power switch 3 is slid by the user to turn on the power to the portable electronic device 1, the system controller 100 starts up the system, thereby displaying a predetermined startup screen for example and then displaying a main menu screen 40 as shown in FIG. 11 on the display block 7 (step 1901). On the main menu screen 40, items "Genre", "Artist", "Album", "All music", and so on are arranged in rows. Scrolling this screen shows additional items. The main menu screen 40 allows the user to search desired music in a layered manner by genre or album for example.

The bottom of the main menu screen 40 is arranged with a time counter 43 for the music being reproduced, a total time 47 of all selected music, a bar 44 indicative of the elapsed time of the music being reproduced in the total time 47, a battery indicator 46, and a current time 48, for example. If music is being reproduced with the main menu screen 40 displayed for example, the title of that music is shown in a box 42 enclosed by dashed lines.

On the main menu screen 40, the user is able to select a desired item by pressing the corresponding operation button 9 in one of rows 1 to 5 and one of columns 2 to 4 (refer to FIG. 9) on the operator block 8. It should be noted that there is no distinction between columns 2 to 4 on a list select screen such as the main menu screen 40, the user may select any one of columns 2 to 4.

Figure 12:
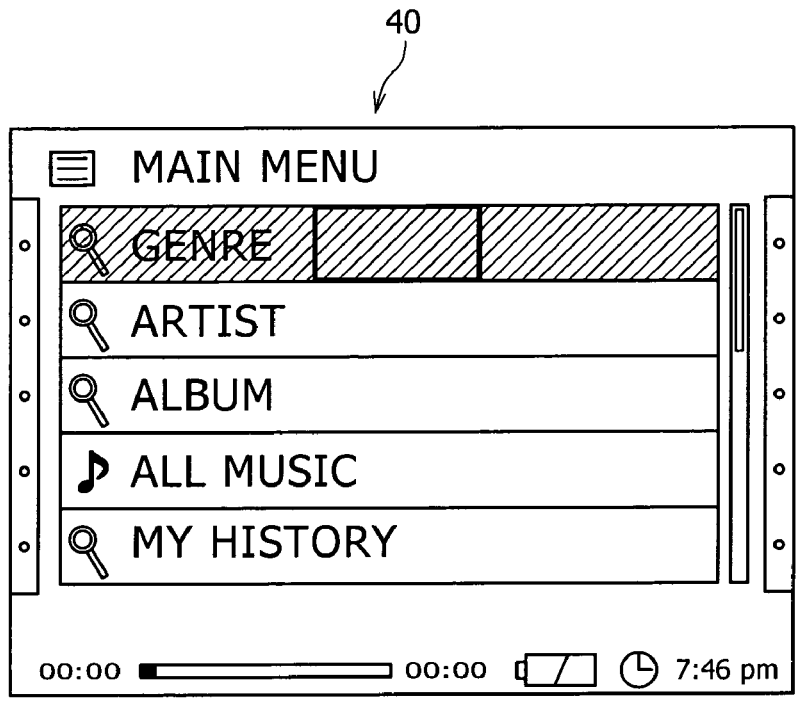
FIG. 12 illustrates an exemplary operation on the main menu screen.

The following describes an example in which the user makes search starting with "Genre". When the user touches one of the operation buttons 9 that is in column 2 to 4 in row 1, namely the operation button 9-3 in row 1 and column 1 for example (YES of step 1902), the display controller 106 displays "Genre" item in a first color (light blue for example) as shown in FIG. 12 (step 1903), moving cursor C to the item corresponding to the operation button 9-3 (step 1904).

It should be noted that, if a move operation is executed to select another item (to be specific) from the state wherein "Genre" is selected, from the operation button 9-2 to operation button 9-3 to operation button 9-4 to operation button 9-5 (YES of step 1905), the display controller 106 sequentially displays the cursor from "Artist" to "Album" to "All music" to "My history" corresponding to the operation buttons 9 touched by the user and colors each cursor-indicated item with the first color (step 1906). When the user executes a long touch operation on row 5 indicative of "My history" (YES of step 1908), the screen is further scrolled down to display other items (step 1908).

Figure 13:
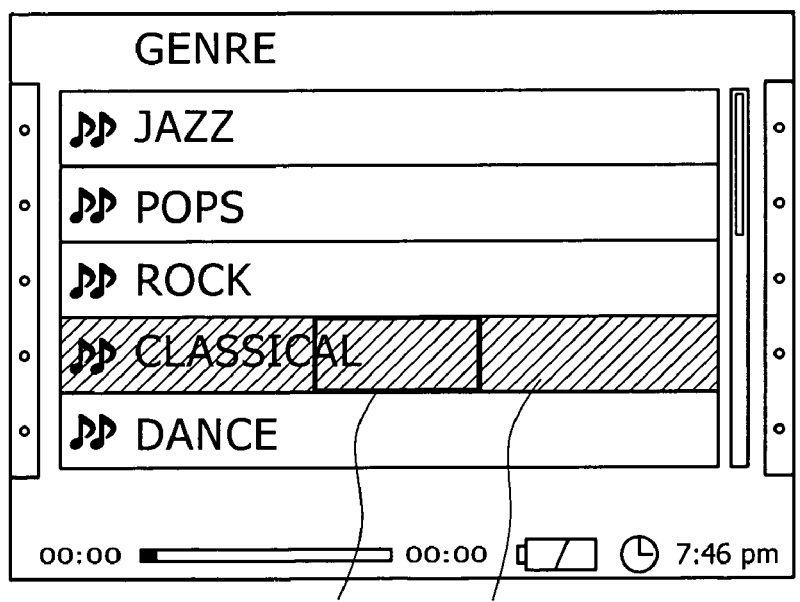
FIG. 13 illustrates an exemplary operation on a genre screen.

When the user presses the operation button 9-3 in this state (YES of step 1909), the display controller 106 colors item "Genre" with a second color (dark blue for example) (step 1910). When the user releases the operation button 9-3 (YES of step 1911), item "Genre" is entered (step 1912). Then, the display controller 106 displays a screen as shown in FIG. 13. When the user touches, presses, and releases the operation button 9-18 in row 4 and column 3 to enter "Classical" for example, the display controller 106 displays a screen as shown in FIG. 14.

Figure 14:
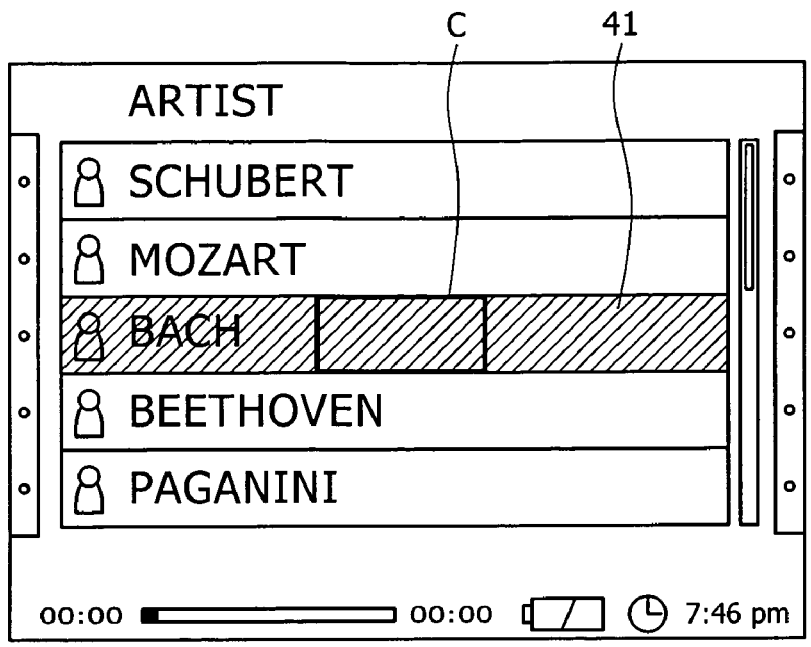
FIG. 14 illustrates an exemplary operation on an artist menu screen.
Figure 15:
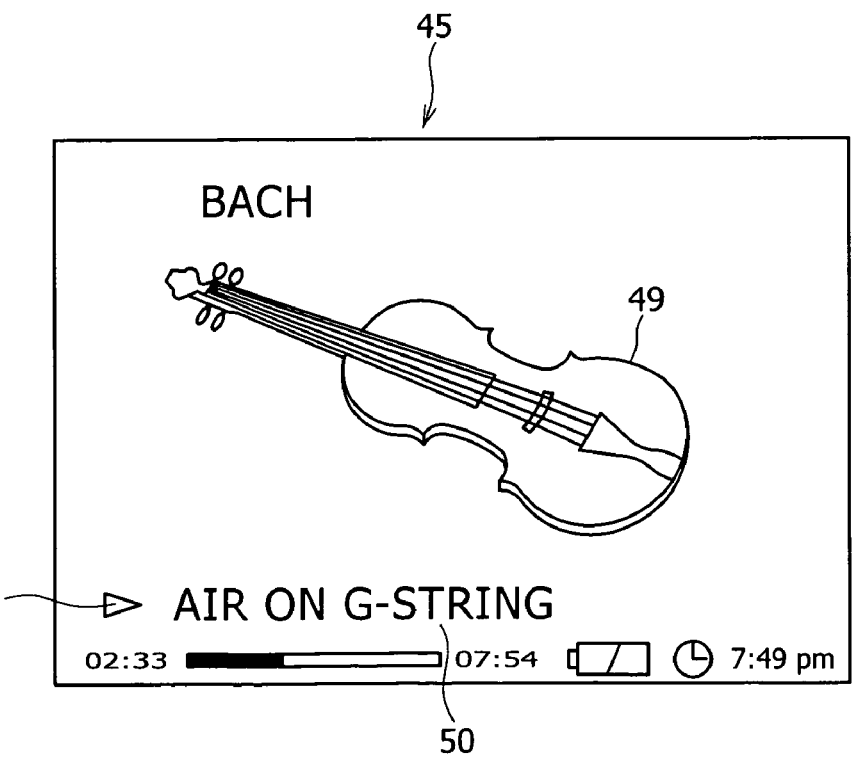
FIG. 15 illustrates a reproduction screen.

If "Bach" and then "Air on G-string" are selected and entered in FIG. 14 (NO of step 1913 to step 1914), the Display controller 106 displays a reproduction screen 45 as shown in FIG. 15 (step 1915). At the same time, the CPU 101 outputs a signal for the reproduction of music "Air on G-string" to the DMA controller 102. Consequently, the DMA controller 102 DMA-transfers the data of that music to the audio decoder 108, by which the transferred data is decoded for reproduction.

The reproduction screen 45 displays an image 49 having the above-mentioned JPEG format, a music title 50, and a marker 51 indicative that the reproduction is going on. The image 49 is an image recorded to the HDD 115 for music, album, artist, or genre. This image may be one downloaded by the user through the PC from the Internet for example or one captured from a digital camera for example into the portable electronic device 1 by the user. If no input is made through the operator block 8 by the user during reproduction of music, an image such as a screen saver for example may be displayed on the reproduction screen 45.

When the user touches any one of the operation buttons 9-5, 9-10, 9-15, 9-20, and 9-25 in row 5 of the operator block 8 with the reproduction screen 45 displayed (YES of step 1916), the display controller 106 displays a reproduction control button 56 as shown in FIG. 19 (step 1917). The reproduction control button 56 includes a fast forward button 56a, a rewind button 56b, a stop button 56c, and volume buttons 56d and 56e. These five buttons of the reproduction control button 56 correspond to the operation buttons 9-5, 9-10, 9-15, 9-20, and 9-25.

When the reproduction control button 56 is displayed and the user touches the button 9-5 in row 1 and column 5 or, when displaying the reproduction control button 56, touches once and moves up to the operation button 9-5 from the touched state without remove (however, the user need not make a move operation if the operation button 9-5 was touched from the beginning to display the reproduction control button 56), the display controller 106 moves cursor C to the corresponding item.

When the user long presses the operation button 9-5 (YES of step 1918), the display controller 106 colors the fast forward button 56a with a third color (violet for example) (step 1919) and the CPU 101 reproduces the current reproduced music in a fast forward manner (step 1920). A fast forward operation may be effected by reproducing only certain intervals of packets among the packets forming a stream of music data. This holds with a rewind operation.

If the user presses and then releases the operation button 9-5 without long pressing, the CPU 101 stops reproducing the currently reproduced music and starts reproducing a next piece of music in the same album or a next piece of music in the programmed reproduction list (step 1921). It should be noted that the reproduction control button 56 may be displayed on the main menu screen 40 shown in FIG. 13 (YES of step 1922 to step 1923).

Figure 16:
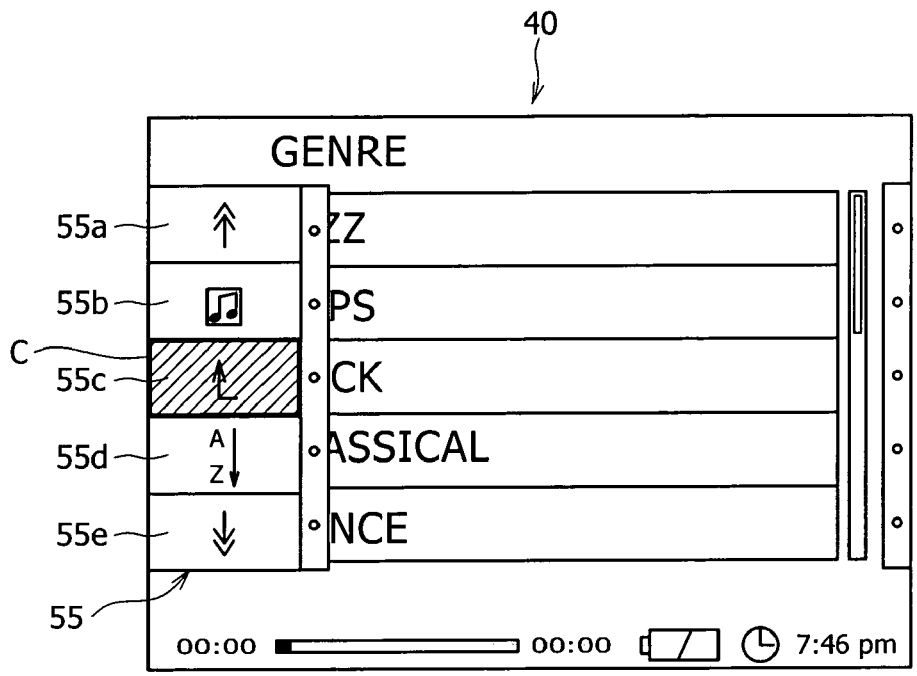
FIG. 16 illustrates navigation buttons.
Figure 17:
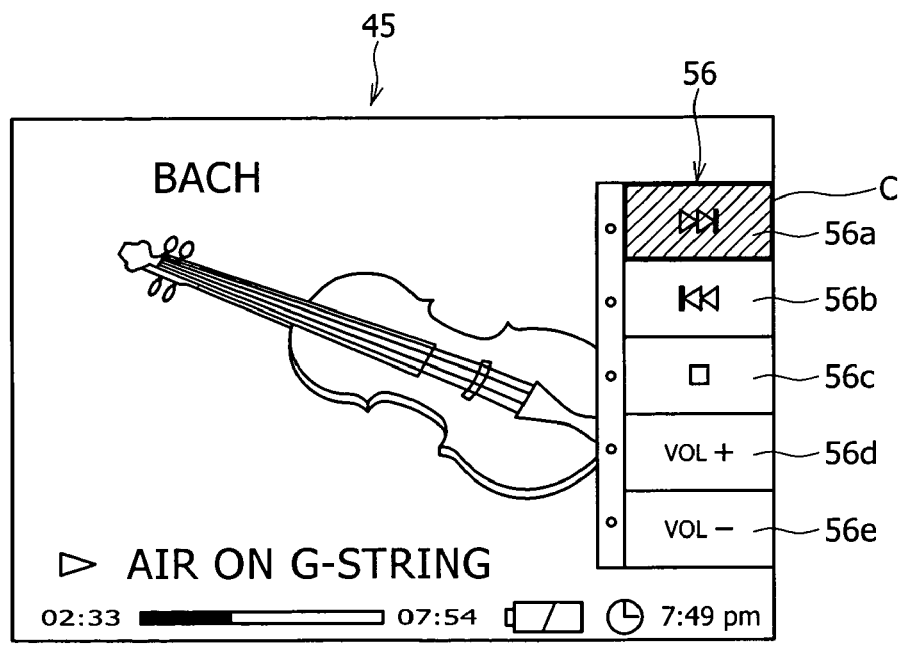
FIG. 17 illustrates reproduction control buttons.

On the other hand, if the user wanting to listen to "Classical" erroneously selects and enters "Rock" and goes to next "Artist" screen in FIG. 13 but wants to return to "Genre" screen, the following operation takes place. For example, when the user touches any one of the operation buttons 9-1, 9-6, 9-11, 9-16, and 9-21 in row 1 on the operator block 8 (YES of step 1913), the display controller 106 displays the navigation button 55 as shown in FIG. 16 (step 1924). The navigation button 55 includes a button 55a for displaying an upper screen not currently displayed on the display block 7, a button 55b for going to a reproduction screen, a button 55c for returning to a preceding screen, a button 55d for changing the sequence of items (or sorting items) on the list select screen for example, and a button 55e for displaying a lower screen not currently displayed on the display block 7. These five buttons of the navigation button 55 correspond to the operation buttons 9-1, 9-6, 9-11, 9-16, and 9-21.

When the navigation button 55 is displayed and the user touches the button 9-11 in row 3 and column 1 for example or, when displaying the navigation button 55, touches once and moves up to the operation button 9-11 from the touched state without remove (however, the user need not make a move operation if the operation button 9-11 was touched from the beginning to display the navigation button 55), the display controller 106 moves cursor C to the corresponding item. When the user presses and then releases the operation button 9-11, "Genre" screen shown in FIG. 13 that is the preceding screen is called back (YES of step 1925). At this moment, the display controller 106 displays the navigation button 55 also on the "Genre" screen. Then, when the user touches, presses, and releases the operation button 9-18 in row 4 and column 3 (or this may be row 4 and column 2 or 4) to enter "Classical" for example, the display controller 106 deletes the navigation button 55 from the display block 7. It should be noted that the navigation button 55 may also be displayed on the main menu screen 40 shown in FIG. 11 (YES of step 1926 to step 1927). In this case, for the navigation button 55, the button 55b for switching the main menu screen 40 to the reproduction screen 45 is displayed. When the user selects this button 55b, the display controller 106 displays the reproduction screen 45 onto the display block 7 (step 1928). Also, the navigation button 55 may be displayed on, the reproduction screen 45 to move to another screen during music reproduction or select and enter another piece of music.

Figure 20:
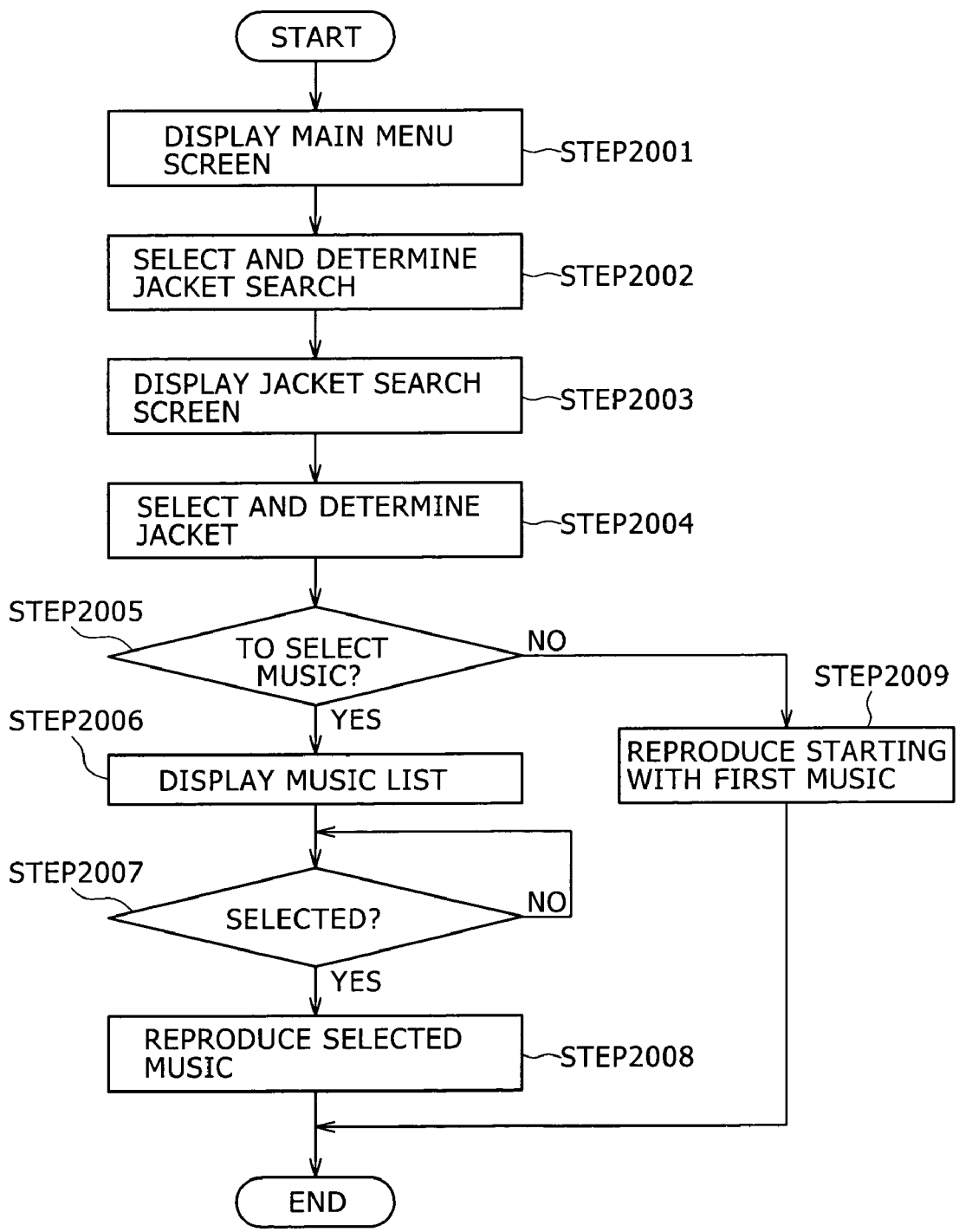
FIG. 20 is a flowchart indicative of an exemplary operation for reproducing music by jacket search.

Referring to FIG. 20, there is shown a flowchart indicative of an operation for selecting an item through a jacket search screen.

When the user selects and enters "Jacket search" (step 2002) with the main menu screen 40 displayed (step 2001), then a jacket search screen as shown in FIG. 18 appears (step 2003). In the jacket search screen 60, items are arranged in a matrix of five rows by three columns. For items, jacket images 61 such as song album CDs for example are displayed. The user is able to select and enter one of these jacket images 61, thereby reproducing music included in the selected album CD. These items correspond to the operation buttons arranged in rows 1 to 5 and columns 2 to 4 for example.

When the user selects one of the buttons in row 1 to 5 and column 2 to 4 and the enters the selection (or touches, presses, and releases one of the buttons) with the jacket search screen 60 displayed (step 2004), the display controller 106 displays a screen (not shown) of a list of music included in the entered album (YES of step 2005, step 2006). When the user selects and enters (or touches, presses, and releases) a piece of music to be listened to from the music list (step 2007), the system controller 100 reproduces the selected and entered piece of music (step 2008).

Alternatively, when one album is selected and entered by the user on the jacket search screen 60 (step 2004), the system controller 100 may reproduce the selected album starting with a first piece of music included in the album (NO of step 2005, step 2009).

In the above-mentioned sequence of operations, the user's finger may not always be in touch with the operator block 8; the user may once remove halfway and then touch again or may touch a different operation button 9 than the operation button 9 touched last, only resulting in focus display or cursor display again.

As described above, in the present embodiment, the display block 7 is arranged in the vicinity of the operator block 8 and the positions of the operation buttons 9 are related with the cursor C positions shown on the display block 7, thereby allowing the user to make confirmation of the cursor C positions by looking at the display block 7 while operating the operation buttons 9, the cursor C moving in accordance with the user's finger movement. The above-mentioned novel configuration allows the user to execute select and enter operations by intuitively operating the operation button 9. In addition, because this novel configuration need not separately arrange any buttons for selecting and entering items, this configuration is suitable for reducing the size of the portable electronic device 1. Generally, a matrix arrange of operation buttons tends to increase the difficulty for the user to operate; however, the present embodiment allows the user to make operations with small number of steps and intuitively.

With the portable electronic device 1 according to the present embodiment, items (or areas) are displayed in correspondence with areas indicated by cursor C. For example, in the main menu screen 40, items "Genre", "Artist", "Album", and so on are displayed in rows. In the jacket search screen 60, the items are displayed in five rows by three columns. For the selection and enter of these items displayed such, the user may only select and enter the operation button 9 corresponding to each desired item, thereby allowing the user to intuitively execute the select and enter operations. In addition, this novel configuration need not separately arrange any buttons for item selection, thereby making it easy for the portable electronic device 1 to be reduced in physical size.

With the portable electronic device 1 according to the present embodiment, the color in which each item is displayed is changed in accordance with a predetermined operation stage. For example, the user touches one of the operation buttons 9 in columns 2 to 4 on the main menu screen, item "Genre" is colored with the first color (light blue for example) and the corresponding item is selected. When the user presses the operation button 9 in this state, item "Genre" is colored with the second color (dark blue for example) and the selection is entered. Therefore, the user is able to intuitively recognize each operation stage only by identifying the color of each item displayed on the display block 7.

With the portable electronic device 1 according to the present embodiment, operations and states of "touch", "long touch", "move", "press", "long press", "drag", and "release" may be separately detected by the operation button 9. This novel configuration allows the user to perform various kinds of operations only with one operation button 9, thereby making it easy to reduce the physical size of the portable electronic device 1.

With the portable electronic device 1 according to the present embodiment, jacket images 61 of song album CDs for example are displayed as items. Selecting any one of the jacket images 61 and entering the selection allows the user to reproduce the music contained in the selected album CD. Consequently, the user is able to reproduce songs in an intuitive manner by selecting the image of the CD containing these songs and entering the selections.

Figure 21:
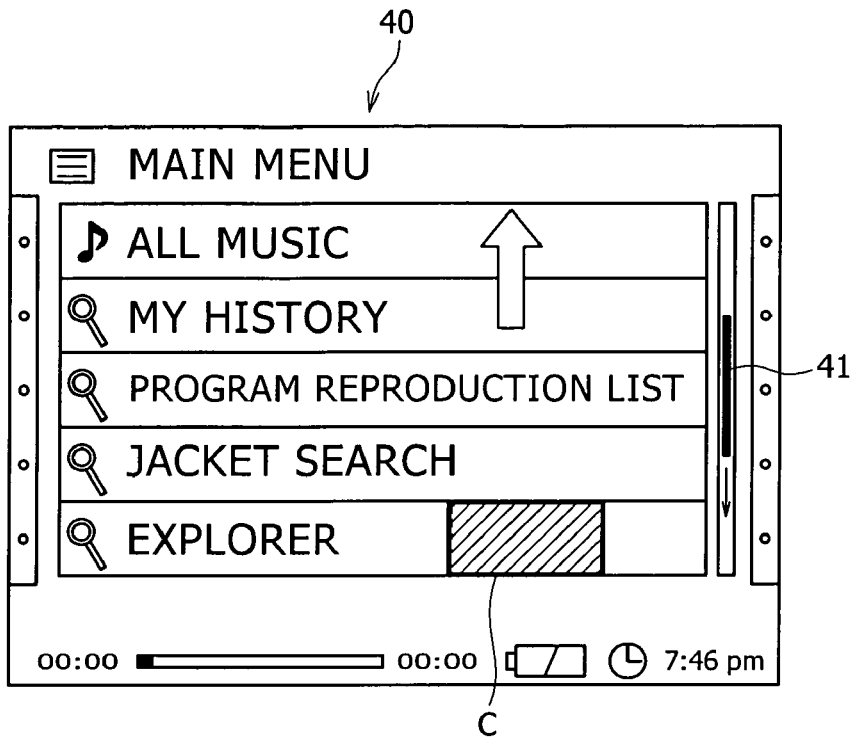
FIG. 21 illustrates a scroll operation on the main menu screen.

The following describes in detail the scroll display operation described in steps 1907 and 1908 shown in FIG. 19. As shown in FIG. 21, suppose that the user execute a long touch operation on any one of the operation buttons 9 arranged in the bottom row 5 and columns 2 to 4 on the main menu screen 40 for example, the operation button 9-24 in column 4 for example. Then, the display controller 106 focus-displays with cursor C an area corresponding to the operation button 9-24 and moves a scroll bar 41 downward on the screen. Consequently, the entire list item screen moves in the direction indicated by white arrow (upward). While the entire list item screen is moving, the display controller 106 continues focus-displaying the area corresponding to the operation button 9-24. When the long touch is cleared of the operation button 9-24 by the user, namely, the user executes a remove operation, the display controller 106 stops scrolling, upon which the area indicated by the cursor (the area corresponding to the operation button 9-24) at the time of the stop of the scroll operation becomes the currently selected area. In this case, the display controller 106 continues displaying the cursor when the remove operation is executed as described above.

Figure 22:
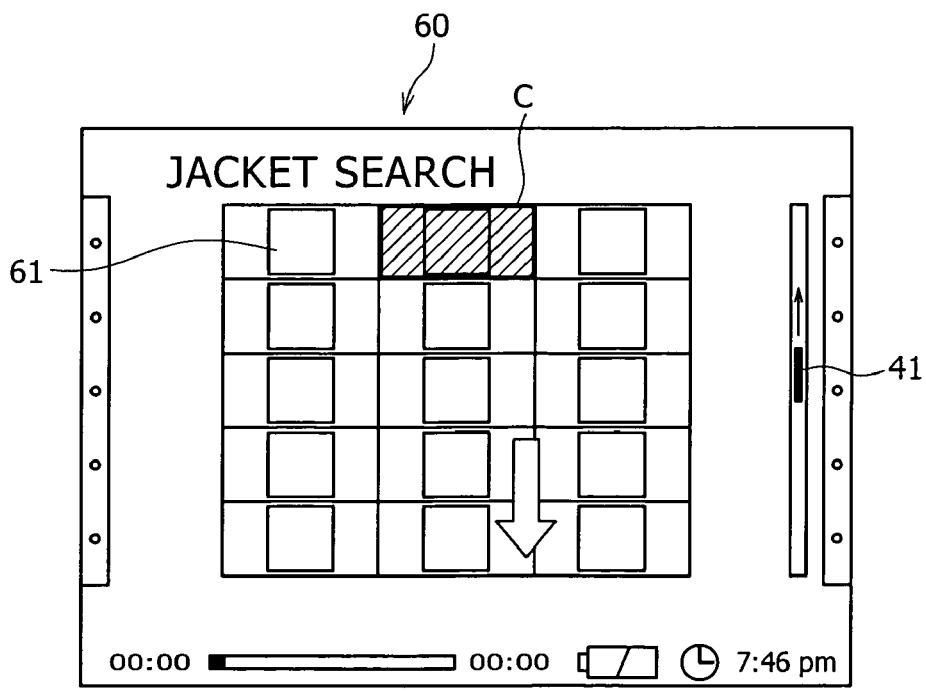
FIG. 22 illustrates a scroll operation on the jacket search screen.

The scroll operation on the jacket search screen 60 shown in FIG. 22 is the same as with the main menu screen 40. The user long touches one of the operation buttons 9 in row 1, the top row, and in columns 2 to 4, the operation button 9-3 in column 3 for example. Then, the display controller 106 focus-displays with cursor C an area corresponding to the operation button 9-3 and moves the scroll bar 41 upward on the screen. Consequently, the entire jacket time screen moves in the direction indicated by white arrow (downward). While the entire jacket item screen is moving, the display controller 106 continues focus-displaying the area corresponding to the operation button 9-3. When the long touch is cleared of the operation button 9-3 by the user, namely, the user executes a remove operation, the display controller 106 stops scrolling, upon which the area indicated by the cursor (the area corresponding to the operation button 9-3) at the time of the stop of the scroll operation becomes the currently selected area.

It should be noted that the system controller 100 may execute control such that the color of the area focus-displayed with cursor C of long touch be changed from the color at the moment of touch (a time until long touch is determined).

As described above, the user is able to scroll each screen only by continuing the state in which the user is touching the operation button 9, thereby facilitating a scroll operation. Especially, as compared with a scroll operation effected by continuing the state in which the operation button is "pressed", the novel configuration allows a scroll operation by the continuation of "touch", thereby mitigating the load of the user's finger.

In order to scroll each screen upward, the user may only long touch the operation button 9 in row 1. In order to scroll each screen downward, the user may only long touch the operation button 9 in row 5. This enhances user's sense of intuition in operating the portable electronic device 1.

It should be noted that the present embodiment is not limited to the above-mentioned embodiment and therefore may be embodied in various other forms.

With the portable electronic device 1 according to the above-mentioned embodiment, the operator block 8 is arranged on the front surface 2a of the main body 2; it is also practicable to arrange the operator block 8 on the rear surface 2b of the main body 2. In this case, the operator block 8 may be arranged at a position that allows the user to operate the operator block 8 with user's index finger for example.

Alternatively, the operator block 8 may be arranged at a plurality of positions on the main body 2 in a divided manner. For example, a grip block may be arranged on each end of the main body 2 and, in the vicinity of these grip blocks, two operator blocks may be arranged. In this case, the user may hold the two grip blocks with the right and left hands, operating the operator blocks with user's thumbs.

In the above description, the portable electronic device 1 according to the above-mentioned embodiment is used to execute music reproduction. It is also practicable to use the portable electronic device 1 to reproduce movies, TV programs, and so on, for example.

As shown in FIGS. 18 and 20, the portable electronic device 1 according to the above-mentioned embodiment allows the selection of content through the jacket search screen 60. Because the area of the display block 7 is relatively limited on the portable electronic device 1, each jacket image must be displayed in a relatively small display area if each jacket image is displayed in five rows by three columns for example, thereby making it sometimes difficult to easily select jacket images.

To overcome the above-mentioned problem, each jacket image may be displayed in a zoom-in manner. The following describes the zoom-in display of jacket images.

Figure 23A:
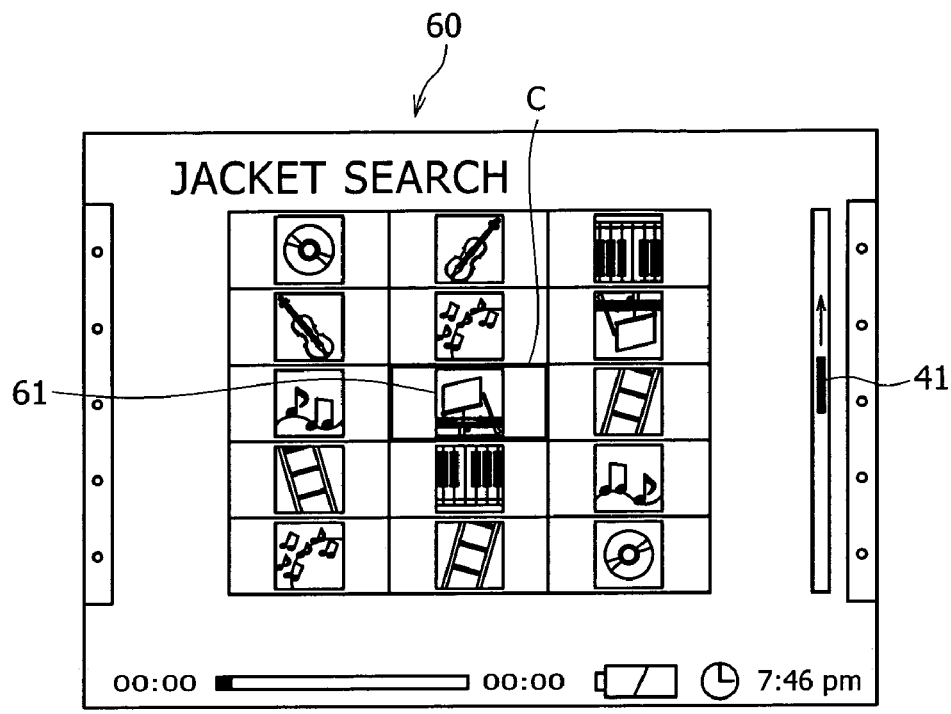
FIGS. 23A and 23B illustrates zoom-in display of jacket images.
Figure 23B:
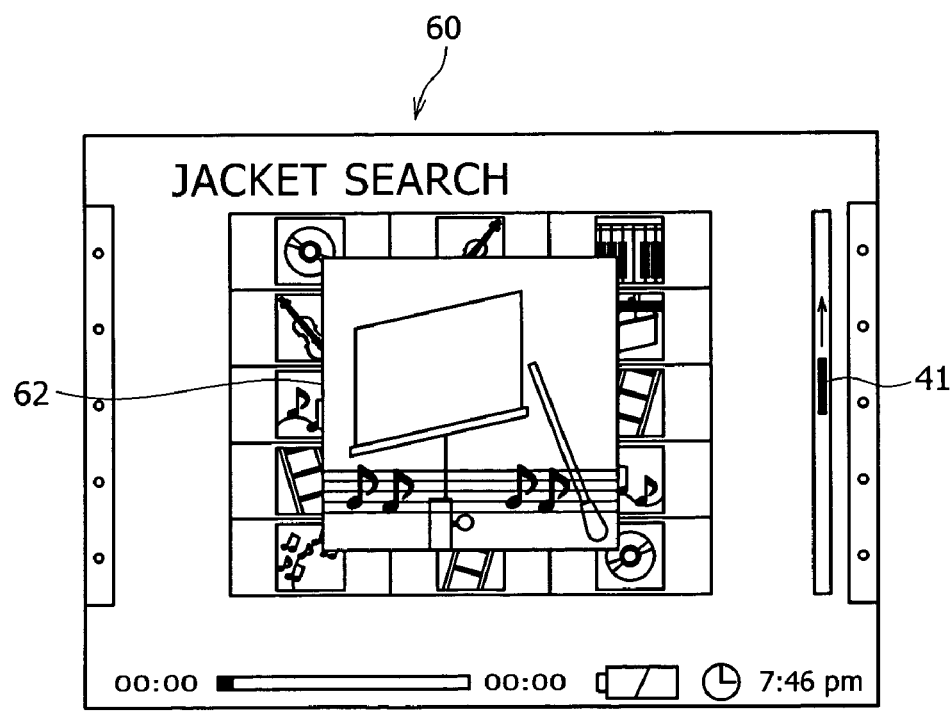

Referring to FIGS. 23A and 23B, there is shown a method in which a jacket image 61 is zoom-in displayed on the jacket search screen 60. As shown in FIG. 23A, if the user touches the operation button 9-13 for example and moves cursor C to the area corresponding to the operation button 9-13 to select the jacket image 61, the jacket image 61 is displayed 0.1 second after the detection of the touch in a manner of about 5 times zoom-in as shown in FIG. 23B. At this moment, the center coordinates of a zoom-in jacket image 62 are the same as the center coordinates of the jacket image 61 before zoom-in. However, the time from the detection of the touch to the zoom-in display and the ratio of zoom-in are not limited to those mentioned above.

Figure 24:
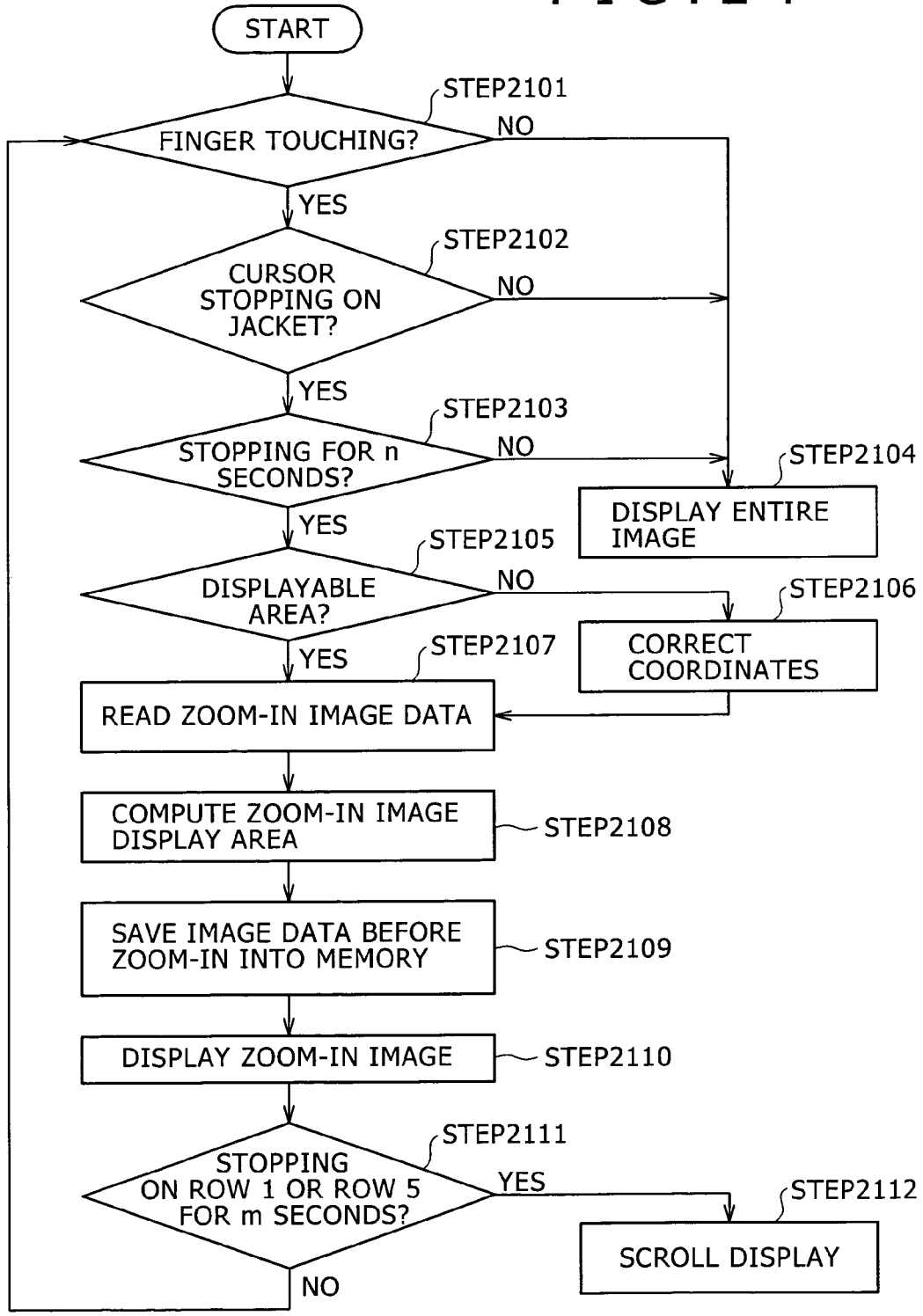
FIG. 24 is a flowchart indicative of an operation to be executed when displaying jacket images in a zoom-in manner.

FIG. 24 is a flowchart indicative of an operation for displaying the jacket image 61 in a zoom-in manner. As shown, with the jacket search screen 60 displayed on the display block 7, the operator block 8 determines whether the user's finger is in touch with the operator block 8 (step 2101). If the user's finger is found not in touch (NO of step 2101), then the display controller 106 displays the jacket search screen 60 in its entirety (step 2104).

If the user's finger is found in touch (YES of step 2101), the display controller 106 determines that cursor C stops at jacket image 61 (step 2102). If cursor C is found not stopped (NO of step 2102), the display controller 106 displays the jacket search screen 60 in its entirety (step 2104). If the cursor C is found stopped (YES of step 2102), the display controller 106 further determines whether cursor C has stopped for n seconds (step 2103). In this example, n=0.1. If cursor C is found not having stopped for n seconds (NO of step 2103), then the display controller 106 displays the jacket search screen 60 in its entirety (step 2104).

If cursor C is found having stopped for n seconds (YES of step 2103), then the display controller 106 determines whether the area cursor C stopped is a displayable area of the zoom-in jacket image 62 (step 2105). As described above, in zooming-in of a jacket image, the center coordinates of the zoom-in jacket image 62 are made the same as those of the jacket image 61 before zoom-in. However, if an attempt is made to zoom in the jacket images 61 in row 1 and row 5 with the same center coordinates, these images may brim over the jacket search screen 60 depending on the zoom-in ratio. Therefore, if the jacket images are extending over the displayable area (NO of step 2105), namely, if cursor C is positioned at row 1 or row 5, the display controller 106 modifies the center coordinates of the zoom-in jacket image 62 such that the center coordinates of the zoom-in jacket image 62 are shifted from the center coordinates of the jacket image 61 before zoom-in in the direction of the center of the jacket search screen 60 (step 2106).

If the images are found in the displayable area (YES of step 2105), then the jacket image 61 is read from the HDD 115 into the SDRAM 113 (step 2107). As described above, for the jacket image 61, a JPEG image 122 that is displayed during song reproduction as shown in FIG. 15 for example is used without change. This makes it unnecessary for separately preparing the zoom-in jacket image 62, thereby saving the storage capacity for example.

Next, on the basis of the size of the zoom-in jacket image 62 read into the SDRAM 113, the display controller 106 computes a display area on the display block 7 of the zoom-in jacket image 62 (step 2108). At this moment, if the coordinate modification has been made in step 2106, this modification is taken into account.

Then, the display controller 106 saves the jacket image 61 before zoom-in into the SDRAM 113 (step 2109). Consequently, when displaying the zoom-in jacket image 62 as the jacket image 61 again in the original entire display, it is no more necessary to redraw the jacket image 61. When the saving of the jacket image 61 into the memory has been completed, the display controller 106 displays the zoom-in jacket image 62 read as above onto the display block 7 on the basis of a result of the above-mentioned computation (step 2110). The zoom-in jacket image 62 is kept displayed while the user is touching the operation button 9. The user executes a press operation on the zoom-in jacket image 62 through the operator block 8 to determine a desired album, after which the reproduction of the selected album for example is executed as described above.

It should be noted that, if the zoom-in jacket image 62 is displayed in the area of row 1 or row 5, the display controller 106 determines whether cursor C stopped at that area for more than m seconds (n<m; in this case, m=1 or 2), namely whether the user is touching the operation button 9 corresponding to that area for more than m seconds (step 2111). If more than m seconds have passed, the display controller 106 deletes the zoom-in jacket image 62 (or saves zoom-in jacket image 62 into the SDRAM 113) and then returns the saved jacket image 61 to that area, thereby scroll-displaying the jacket search screen 60 upward or downward (step 2112). The display controller 106 repeats the above-mentioned operation every time the user operation takes place.

The above-mentioned operation, namely the zoom-in display of each jacket image, makes it easier for the user to view each content to be selected, so that the user is able to execute the above-mentioned intuitive selection of content more easily. It should be noted that the image data scheme for use in jacket zoom-in images is not limited to JPEG; bitmap may also be available for example.

With the portable electronic device 1 according to the above-mentioned embodiment, each screen is displayed in scroll if long touch is detected as shown in FIGS. 19 and 21. However, in the case of portable electronic devices, the internal bus rate and drawing capabilities are limited, so that the above-mentioned scroll display is not speeded up beyond a certain level. Therefore, if the user wants to quickly check many pieces of information by scroll display, such as browsing all songs stored in the portable electronic device 1 for selection for example, some inconvenience may take place.

Therefore, in the present invention, it is also practicable to enhance scroll speed by changing the number of object display rows and the object display colors. The following describes the changing of the number of display rows and the display colors.

Figure 25A:
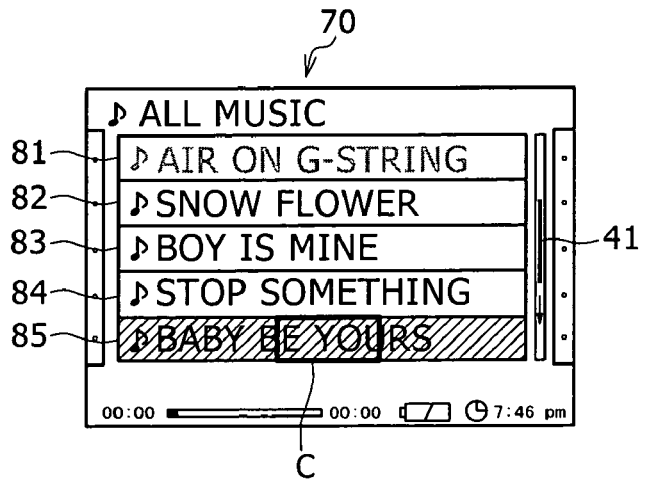
FIGS. 25A, 25B, and 25C illustrate manners in which the number of display rows and display colors are changed in scroll display.
Figure 25B:
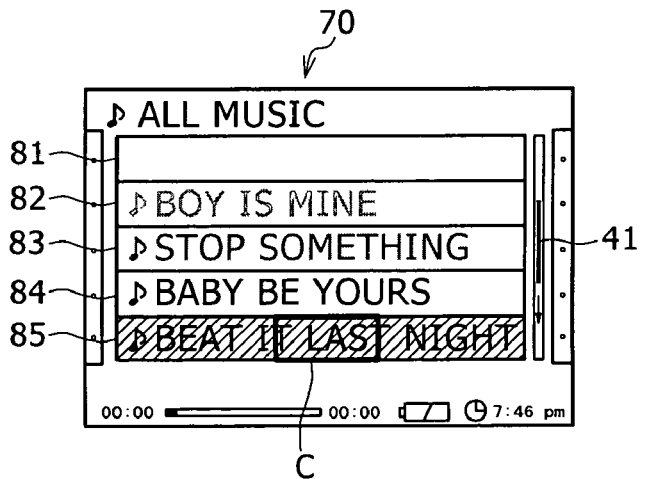
Figure 25C:
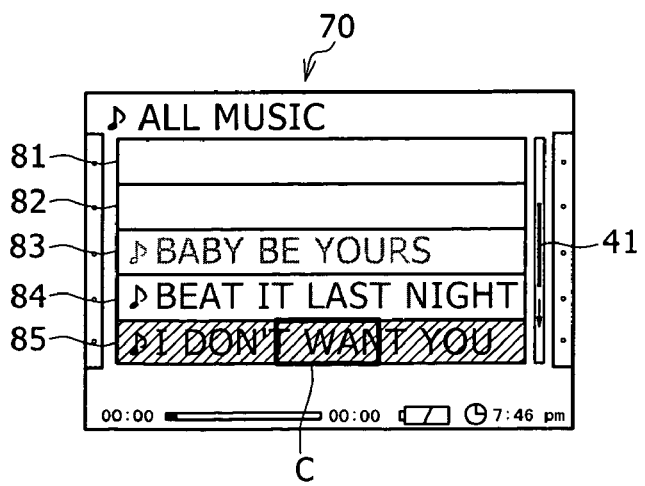

Referring to FIGS. 25A, 25B, and 25C, there is shown a method in which the number of object display rows and the object display colors are changed in scroll display. In these figures, an example of an entire music list display screen 70 is used in which all songs stored in the HDD 115 are displayed in a list.

When the user long touches one of the operation buttons 9 in row 5 and in columns 2 to 4 to execute downward scroll display by moving cursor C to row 5, it is a general practice to make scroll while displaying objects (letters) in five rows on the screen (refer to FIG. 21 for example). The color of the letters in this case is set to white (with black background) for example.

When the screen has been scrolled by the predetermined number of rows (20 rows for example), the color of an object 81 (in this case, letters indicative of a song name) in row 1 that is remotest from the scroll direction is changed to a color lower in brightness than white, a light gray for example, as shown in FIG. 25A. When the screen is further scrolled, the object in row 1 is not displayed, displaying the objects in the remaining four rows, as shown in FIG. 25B. At the same time, the color of an object 82 in row 2 is changed to a dark gray that is nearer to the background black than the above-mentioned light gray and the color of an object 83 in row 3 is changed to the above-mentioned light gray. When the screen is scrolled still further, the object in row 2 are also not displayed for example, displaying the objects in the remaining three rows and the color of an object 83 in row 3 is changed to the above-mentioned dark gray and the color of an object 84 in row 4 is changed to the above-mentioned light gray, as shown in FIG. 25C. Consequently, in this case, only the object in row 5 at bottom in the scroll direction is displayed normally.

Figures 26, 27:
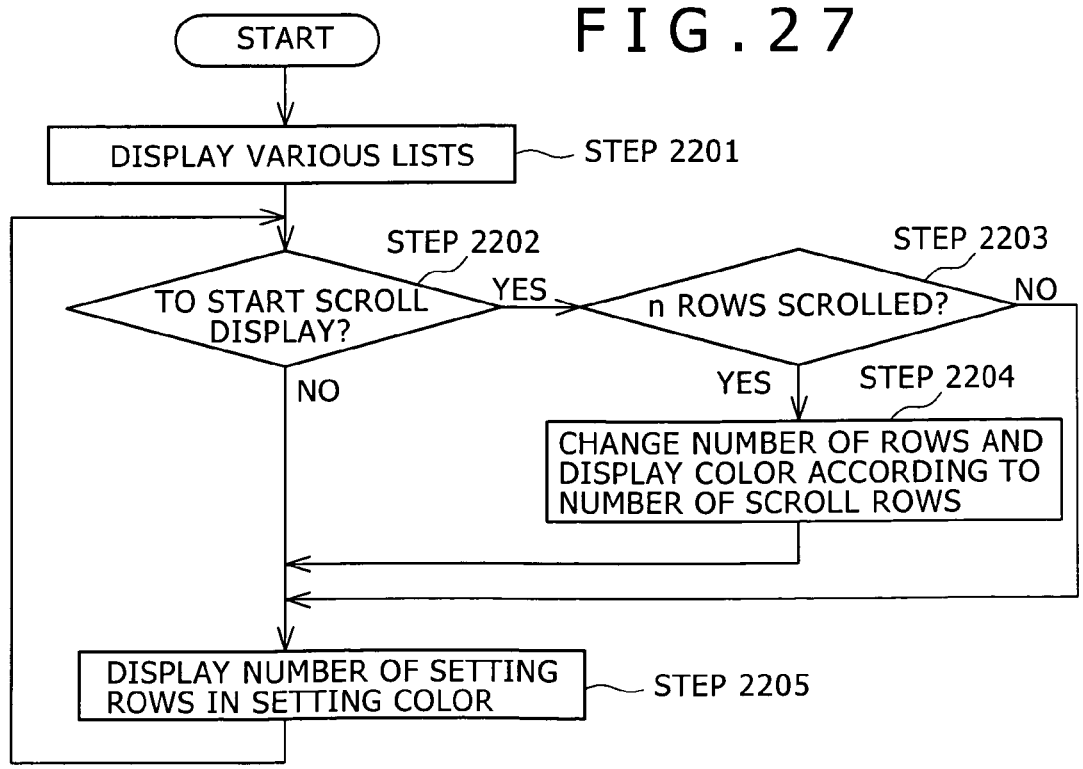
FIG. 26 is a setting table for setting the number of display lines and display colors.
FIG. 27 is a flowchart indicative of an operation for changing the number of display lines and display colors.

Referring to FIG. 26, there is shown a setting table for setting the above-mentioned number of display rows and the above-mentioned display colors. As shown, the number of display rows and the display colors are set in 5 levels depending on the number of scroll rows and the scroll time.

Level 1 indicates a case in which the number of scroll rows is 0 to 19 and the number of display rows is five and the color of letters is white as normal.

Level 2 indicates a case in which the screen has been scrolled by 20 rows, the number of display rows is five, and the color of the letters of the object in row 1 or row 5 is changed to a color less bright than white (a light gray).

Level 3 indicates a case in which the screen has been scrolled by 21 rows, the number of display rows is five, the color of the object in row 1 or row 5 changed to the above-mentioned light gray is changed to a dark gray, and the color of the object in row 2 or row 4 that is immediately below or above this dark gray object is changed to the above-mentioned light gray.

Level 4 indicates that the screen has been scrolled by 22 rows, the object in row 1 or row 5 is not displayed, the number of display rows is four, the color of the object in row 2 or row 4 that is immediately below of above the object in the row not displayed is changed to a dark gray, and the color of the object in row 3 that is two objects below or above this dark gray object is changed to a light gray.

Level 5 indicates a case in which the screen has been scrolled by 23 rows, the objects in row 2 and row 4 are not displayed, the color of the object in row 3 that is immediately below or above each object not displayed is changed to a dark gray, and the color of the object in row 4 or row 2 that is immediately below or above that dark gray object is changed to a light gray.

These pieces of setting data are stored in the HDD 115 in advance. It should be noted that, in the above-mentioned example, the number of display rows is reduced to three because, while maintaining a high scroll display speed, the number of rows is considered in which the user is able to easily follow each object being scrolled by user's dynamic visual acuity. Therefore, the number of rows is not limited to three. The number of rows to be normally displayed is not limited to the above-mentioned five.

Referring to FIG. 27, there is shown a flowchart indicative of an operation for the above-mentioned changing of the number of display rows and the display colors. As shown, when a list screen having relatively many objects, such as the entire list display screen 70 for example, is displayed (step 2201), the display controller 106 checks to see if scroll display gets started (step 2202). If no scroll is found executed (NO of step 2201), the display controller 106 displays the objects in the normal number of rows and color (five rows and white for example) on the basis of the above-mentioned setting data (step 2205). If scroll gets started (YES of step 2202), the display controller 106 determines whether the screen has been scrolled by more than n rows that is the above-mentioned number of setting rows (n=20 for example). If the number of rows is found less than n rows, the display controller 106 executes the normal display as described above without changing the number of display rows and the display colors (step 2205). If the screen has been scrolled by more than n rows (YES of step 2203), the display controller 106 changes the setting of the number of rows from five rows to four rows to three rows on the basis of the above-mentioned setting data and, at the same time, changes the display colors from white to light gray to dark gray for example (step 2204). Then, on the basis of the changed setting data, the display controller 106 display changes the number of display rows and the display colors to display the objects (step 2205). The display controller 106 repeats the above-mentioned operation every time a scroll operation takes place.

Owing to the above-mentioned operation, the number of object display rows is reduced from normal five to three, so that the amount of data to be called from the HDD 115 for example may be reduced to eventually enhance the scroll speed, thereby allowing the user to quickly check desired objects.

In addition, the number of display rows is gradually changed and the display color is also gradually changed such that the brightness thereof lowers as each object gets farther from the scroll direction, thereby allowing the user to easily recognize the gradual increase in scroll speed without use of complicated animation.

It should be noted that the number of scroll rows with which the changing of the number of display rows and the display colors is started is not limited to above-mentioned 20. It is also practicable to start changing the number of display rows and the display colors when a predetermined period of time (5 seconds for example) has passed from the start of scroll, rather than on the basis of the number of scroll rows.

It is also practicable to execute the above-mentioned changing in scrolling the screen horizontally (on a column basis). The display colors that are subject to change may be any colors as far as these colors allow the recognition that the scroll speed is gradually gaining.

While preferred embodiments of the present invention have been described using specific terms, such description is for illustrative purpose only, and it is to be understood that changes and variations may be made without departing from the spirit or scope of the following claims.

What is claimed is:

1. A portable electronic device comprising: an operator block having a plurality of operation buttons arranged in matrix;
   a display block, arranged in the vicinity of said operator block, configured to display a screen divided into a plurality of areas corresponding to the arrangement of said plurality of operation buttons, to display a cursor for selecting each said areas, and to enter the selection by operation of each of said operation buttons;
   a detection unit configured to detect whether any one of said plurality of operation buttons has been operated;
   an item display control unit configured to relate an object displayed on said screen with a predetermined function executable by said portable electronic device, display a menu in plural areas of said screen, display an item frame assigned a function in said one area of said plural areas of the menu, and display a region on said screen corresponding to at least one of the operation buttons not to be assigned any function while the menu is displayed on the screen; and
   a focus display control unit configured to focus a selected item frame and not to focus said region when said operation button corresponding to said region not to be assigned said function is operated,
   wherein said item display control unit includes a scroll display control unit configured to execute control such that an image is displayed in scroll when said detection unit detects said first state in excess of a predetermined period of time
   wherein said item display control unit is configured to display said object by a first number of objects on a row or column basis and said scroll display control unit includes a change unit configured to change the number of objects to be displayed in scroll from said first number of objects to a second number of objects smaller than said first number of objects when said screen has been scrolled by one of a predetermined number of rows and a predetermined number of columns, and said change unit is configured to gradually change the number of objects from said first number of objects to said second number of objects, and to gradually change a color of said object to a color higher in brightness toward said scroll direction in synchronization with said gradual change in the number of objects.

2. The portable electronic device according to claim 1, wherein said item display control unit is configured to execute control to change a color of said object and display said object of the changed color in accordance with a predetermined operation level.

3. The portable electronic device according to claim 1, wherein said detection unit is configured to detect a distinction between a first state in which an operation button is touched by a user and a second state in which said operation button is pressed by the user.

4. The portable electronic device according to claim 3, wherein said detection unit is configured to detect a distinction between an operation in which said operation button is released by the user from said first state and an operation in which said operation button is returned by the user from said second state to said first state.

5. The portable electronic device according to claim 1, wherein said item display control unit includes, an image display unit configured to display an image symbolizing content to be reproduced, and a control unit configured to execute control such that said content is reproduced when said image is selected and the selection is entered by a user.

6. The portable electronic device according to claim 5, wherein said image display unit includes a zoom-in display unit configured to display said image when said detection unit detects said first state in excess of a predetermined period of time.

7. The portable electronic device according to claim 1, wherein said scroll display control unit executes scroll display when said detection unit detects that at least one of said operation buttons that is in one of an end row and an end column is touched by a user.

* * * * *